US00RE49828E

(19) United States
(12) Reissued Patent
Steiner et al.

(10) Patent Number: US RE49,828 E
(45) Date of Reissued Patent: Feb. 6, 2024

(54) ULTRASONIC SENSING SYSTEM

(71) Applicant: Lutron Technology Company LLC, Coopersburg, PA (US)

(72) Inventors: James P. Steiner, Royersford, PA (US); Greg Edward Sloan, Allentown, PA (US)

(73) Assignee: Lutron Technology Company LLC, Coopersburg, PA (US)

(21) Appl. No.: 16/999,558

(22) Filed: Aug. 21, 2020

Related U.S. Patent Documents

Reissue of:
(64) Patent No.: 10,054,916
Issued: Aug. 21, 2018
Appl. No.: 14/569,618
Filed: Dec. 12, 2014

U.S. Applications:
(60) Provisional application No. 61/918,008, filed on Dec. 19, 2013.

(51) Int. Cl.
*H02J 3/00* (2006.01)
*G05B 15/02* (2006.01)

(52) U.S. Cl.
CPC ..... *G05B 15/02* (2013.01)

(58) Field of Classification Search
CPC ..... H05B 47/115; H05B 47/11; H05B 47/13; H05B 47/19; H05B 19/0423;
(Continued)

(56) References Cited

U.S. PATENT DOCUMENTS 4,254,483 A 3/1981 Vidovic
4,360,905 A 11/1982 Hackett
(Continued)

FOREIGN PATENT DOCUMENTS

EP 0958562 B1 * 11/2005

OTHER PUBLICATIONS

Peter Hauptmann et al., Applicaiton of ultrasonic sensors in the process industry, 2002, Institute of Physics Publishing, Measurement Science and technology 13, pp R73-R83, PII:S0957-0233(02)34745-3.*

(Continued)

*Primary Examiner* — John M Hotaling, II
(74) *Attorney, Agent, or Firm* — Michael S. Czarnecki; Glen R. Farbanish; Philip N. Smith

(57) ABSTRACT

A low-cost, simple ultrasonic sensing system has an increased detection range. The ultrasonic sensing system may be implemented as part of a load control system for controlling the power delivered from an AC power source to an electrical load. The load control system may comprise a load control device for controlling the power delivered to the electrical load, an ultrasonic receiver for receiving ultrasonic waves characterized by an ultrasonic frequency, and an ultrasonic transmitter located remotely from the ultrasonic receiver. The load control device controls the power delivered to the electrical load in response to the ultrasonic waves received by the ultrasonic receiver. The load control device may include the ultrasonic receiver and may be a wall-mounted load control device. The ultrasonic receiver may be a wireless ultrasonic receiver for transmitting wireless signals to the load control device in response to the ultrasonic waves received by the ultrasonic receiver.

37 Claims, 15 Drawing Sheets

(58) Field of Classification Search
CPC .... H05B 45/396; H04B 10/114; H03B 5/362; H08B 13/2417; H03K 17/94; G01S 7/521; G01S 15/87; F24F 11/30
USPC ..... 340/540, 541, 8.1, 573.1, 539.3; 307/117, 326; 315/159, 151; 367/93; 331/116 R; 320/166, 134; 385/125
See application file for complete search history.

(56) References Cited

U.S. PATENT DOCUMENTS

| | | | | |
|---|---|---|---|---|
| 4,661,720 | A * | 4/1987 | Cameron, Jr. | H03K 17/94 307/117 |
| 4,864,256 | A * | 9/1989 | Barnert | H03B 5/362 331/116 R |
| 4,973,837 | A | 11/1990 | Bradbeer | |
| 5,081,406 | A * | 1/1992 | Hughes | B23D 59/005 318/478 |
| 5,210,484 | A | 5/1993 | Remillard et al. | |
| 5,850,045 | A | 12/1998 | Harada et al. | |
| 5,987,205 | A * | 11/1999 | Moseley | H04B 10/114 385/125 |
| 6,697,757 | B2 | 2/2004 | Eckel et al. | |
| 6,759,954 | B1 * | 7/2004 | Myron | H05B 37/0227 315/294 |
| 6,914,552 | B1 | 7/2005 | McEwan | |
| 7,211,798 | B2 | 5/2007 | Wu et al. | |
| 7,884,727 | B2 | 2/2011 | Tran | |
| 8,009,042 | B2 * | 8/2011 | Steiner | H05B 47/115 340/541 |
| 8,514,075 | B1 | 8/2013 | Steiner | |
| 9,157,996 | B1 * | 10/2015 | Elwell | G01S 15/87 |
| 2002/0167417 | A1 * | 11/2002 | Welles, II | G08B 13/2417 340/8.1 |
| 2009/0072766 | A1 * | 3/2009 | Null | H05B 37/0218 315/361 |
| 2010/0052574 | A1 | 3/2010 | Blakeley et al. | |
| 2010/0052576 | A1 | 3/2010 | Steiner et al. | |
| 2010/0052894 | A1 | 3/2010 | Steiner et al. | |
| 2010/0207759 | A1 | 8/2010 | Sloan et al. | H05B 47/115 340/540 |
| 2010/0270982 | A1 * | 10/2010 | Hausman, Jr. | H02J 7/00 320/166 |
| 2010/0277306 | A1 * | 11/2010 | Leinen | H05B 47/19 340/539.3 |
| 2011/0012433 | A1 * | 1/2011 | Parsons | H05B 47/19 307/117 |
| 2011/0034300 | A1 * | 2/2011 | Hall | A63B 5/11 482/1 |
| 2011/0156911 | A1 * | 6/2011 | Caglianone | G05B 19/0423 340/573.1 |
| 2012/0098440 | A1 * | 4/2012 | Yen | H05B 45/395 315/159 |
| 2012/0286676 | A1 * | 11/2012 | Saveri, III | H05B 47/13 315/159 |
| 2012/0313456 | A1 * | 12/2012 | Baragona | H05B 47/19 307/326 |
| 2012/0313588 | A1 * | 12/2012 | Carberry | F24F 11/30 320/134 |
| 2014/0062340 | A1 * | 3/2014 | Elgayyar | H05B 37/0245 315/360 |
| 2014/0088904 | A1 * | 3/2014 | Covaro | G05B 15/02 702/94 |
| 2014/0119160 | A1 * | 5/2014 | Shilling | G01S 7/521 367/93 |
| 2015/0334809 | A1 * | 11/2015 | Mans | H05B 47/11 315/151 |

OTHER PUBLICATIONS

Wattstopper, DW-103 Dual Technology Multi-way Wall Switch Sensor, Pub .No. 34702 rev. Sep. 2010.

* cited by examiner

700

ULTRASONIC SENSING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue of U.S. Pat. No. 10,054,916, issued Aug. 21, 2018 from U.S. patent application Ser. No. 14/569,618, filed Dec. 12, 2014, which is hereby incorporated by reference in its entirety. U.S. Pat. No. 10,054,916* claims the benefit of U.S. Provisional Application No. 61/918,008, filed Dec. 12, 2013, which is incorporated by reference herein as if fully set forth.

BACKGROUND

Occupancy and vacancy sensors are often used to detect occupancy and/or vacancy conditions in a space in order to control an electrical load, such as a lighting load. An occupancy sensor typically operates to turn on the lighting load when the occupancy sensor detects the presence of a user in the space (i.e., an occupancy event) and then to turn off the lighting load when the occupancy sensor detects that the user has left the space (i.e., a vacancy event). A vacancy sensor may only operate to turn off the lighting load when the vacancy sensor detects a vacancy in the space. Therefore, when using a vacancy sensor, the lighting load must be turned on manually (e.g., in response to a manual actuation of a control actuator).

Occupancy and vacancy sensors have often been provided in wall-mounted load control devices that are coupled between an alternating-current (AC) power source and an electrical load for control of the amount of power delivered to the electrical load. Some occupancy and vacancy sensors have been provided as part of lighting control systems. These sensors are often coupled via a wired control link to a lighting controller (e.g., a central processor), which then controls the lighting loads accordingly. Alternatively, the sensors may be battery-powered and may be operable to transmit wireless signals, such as radio-frequency (RF) signals, to load control devices, such as dimmer switches. These occupancy and vacancy sensors are not required to be mounted in electrical wallboxes, but may be mounted to the ceiling or high on a wall. Therefore, the occupancy and vacancy sensors may be positioned optimally to detect the presence of the user in all areas of the space.

Occupancy and vacancy sensors typically include internal detectors, such as a pyroelectric infrared (PIR) detector and a lens for directing energy to the PIR detector for detecting the presence of the user in the space. Some occupancy and vacancy sensors have included ultrasonic transmitting and receiving circuits for detecting the presence of the user in the space. Ultrasonic sensors transmit ultrasonic waves at a predetermined frequency and analyze received ultrasonic waves to determine if there is an occupant in the space. The received ultrasonic waves that are reflected off of moving objects will be characterized by a Doppler shift with respect to the transmitted ultrasonic waves, while the received ultrasonic waves that are produced by reflections off of the walls, ceiling, floor, and other stationary objects of the room will not have a Doppler shift. Therefore, ultrasonic occupancy and vacancy sensors are able to determine if there is an occupant in the space if there is a Doppler shift between the frequencies of the transmitted and received ultrasonic waves.

Generally, the size of the objects that produce the ultrasonic waves having the Doppler shift (i.e., a moving hand) are very small and produce reflected ultrasonic waves having small magnitudes. One of the issues with detecting ultrasonic waves having a Doppler shift is that these received ultrasonic waves can be difficult to distinguish from the received ultrasonic waves that do not have a Doppler shift. A figure of merit for occupancy detection limits can be described using the signal-to-interference ratio (SIR), which is the ratio of the Doppler-shifted ultrasonic waves expressed in sound pressure level (SPL) to the non-Doppler-shifted ultrasonic waves.

One prior art implementation for detecting Doppler shifts in ultrasonic waves uses a phase-lock-loop (PLL) integrated circuit (IC), such as part number CD74HC7046, manufactured by Texas Instruments Incorporated. In this implementation, the received ultrasonic waves are amplified by a pre-amplifier and then compared with a single fixed threshold (e.g., 100 mV) using a comparator to yield a binary waveform. The binary waveform is then applied to an exclusive- or (XOR) gate where the second input to the XOR is a clock input (e.g., a 40-kHz clock signal) that also drives the ultrasonic transmitting circuit. The resulting signal is then passed through a band-pass filter to extract the Doppler signal. The resulting Doppler signal is then compared to a fixed threshold using another comparator to detect an occupancy or vacancy condition. A drawback of this implementation is that the circuit is very sensitive to the thresholds of the comparators and only works on signals with an SIR greater than approximately −40 dB.

Another prior art implementation for detecting Doppler shift utilizes the detection algorithm primarily within a microcontroller. In this implementation, the received ultrasonic waves are amplified by a preamplifier and then sampled using an analog-to-digital converter (e.g., an 8- to 12-bit ADC) in the microcontroller. The remainder of the algorithm is essentially the same as in the first form for detecting Doppler shift described above, except that the remainder of the algorithm of the second form is executed in the software of the microcontroller. This implementation depends on the accuracy of the ADC of the microcontroller and is limited by numerical noise due to the ADC quantization and the numerical precision used to calculate the results, which thus limits the ability to detect small-magnitude ultrasonic waves that have a Doppler shift.

An amplitude-modulation (AM) demodulator may be used to detect Doppler shift. An AM demodulator, in its simplest form, uses a diode and a low-pass filter to form an envelope detector. The limitation of this circuit is that the received ultrasonic signal must have a minimum amplitude to render the diode conductive, thereby reducing the ability of the circuit to detect small-magnitude ultrasonic waves that have a Doppler shift.

FIG. 1 is a diagram of a room 100 (e.g., a classroom) illustrating a detection range 120 of a prior art ultrasonic occupancy sensor 112. For example, the prior art ultrasonic occupancy sensor 112 may be wall-mounted in an electrical wallbox and may be coupled in series electrical connection between an AC power source and an electrical load (e.g., the lights of the room 100) for turning the electrical load on and off. The detection range 120 extends from the ultrasonic occupancy sensor 112 into the room. There are large areas of the room, however, that are not covered by the detection range 120 of the single ultrasonic occupancy sensor 112. Additional ultrasonic occupancy sensors may be added to the room to increase the total detection range. However, this can become costly, as well as complicate installation since there may not be electrical wallboxes or electrical wires installed at the desired locations for the additional ultrasonic occupancy sensors.

SUMMARY

As described herein, a low-cost, simple ultrasonic sensing system may have an increased detection range. The ultrasonic sensing system may be implemented as part of a load control system for controlling the power delivered from an AC power source to an electrical load. The load control system may include a load control device adapted to be coupled in series electrical connection between the AC power source and the electrical load for controlling the power delivered to the electrical load, an ultrasonic receiver for receiving ultrasonic waves characterized by an ultrasonic frequency, and an ultrasonic transmitter located remotely from the ultrasonic receiver. The ultrasonic transmitter is operable to transmit ultrasonic waves at approximately the ultrasonic frequency. The load control device is configured to control the power delivered to the electrical load in response to the ultrasonic waves received by the ultrasonic receiver. For example, the load control device may include the ultrasonic receiver and may be a wall-mounted load control device. Alternatively, the ultrasonic receiver may be a wireless ultrasonic receiver for transmitting wireless signals to the load control device in response to the ultrasonic waves received by the ultrasonic receiver.

An ultrasonic transmitter, as described herein, may include: (1) an ultrasonic transmitting element for transmitting ultrasonic waves; (2) a drive circuit coupled to the ultrasonic transmitting element for energizing the ultrasonic transmitting element; and (3) a low phase-noise oscillator circuit generating an oscillating signal. The oscillator circuit direct drives the drive circuit to cause the ultrasonic transmitting element to transmit the ultrasonic waves at an ultrasonic transmission frequency.

DETAILED DESCRIPTION

Figure 1:
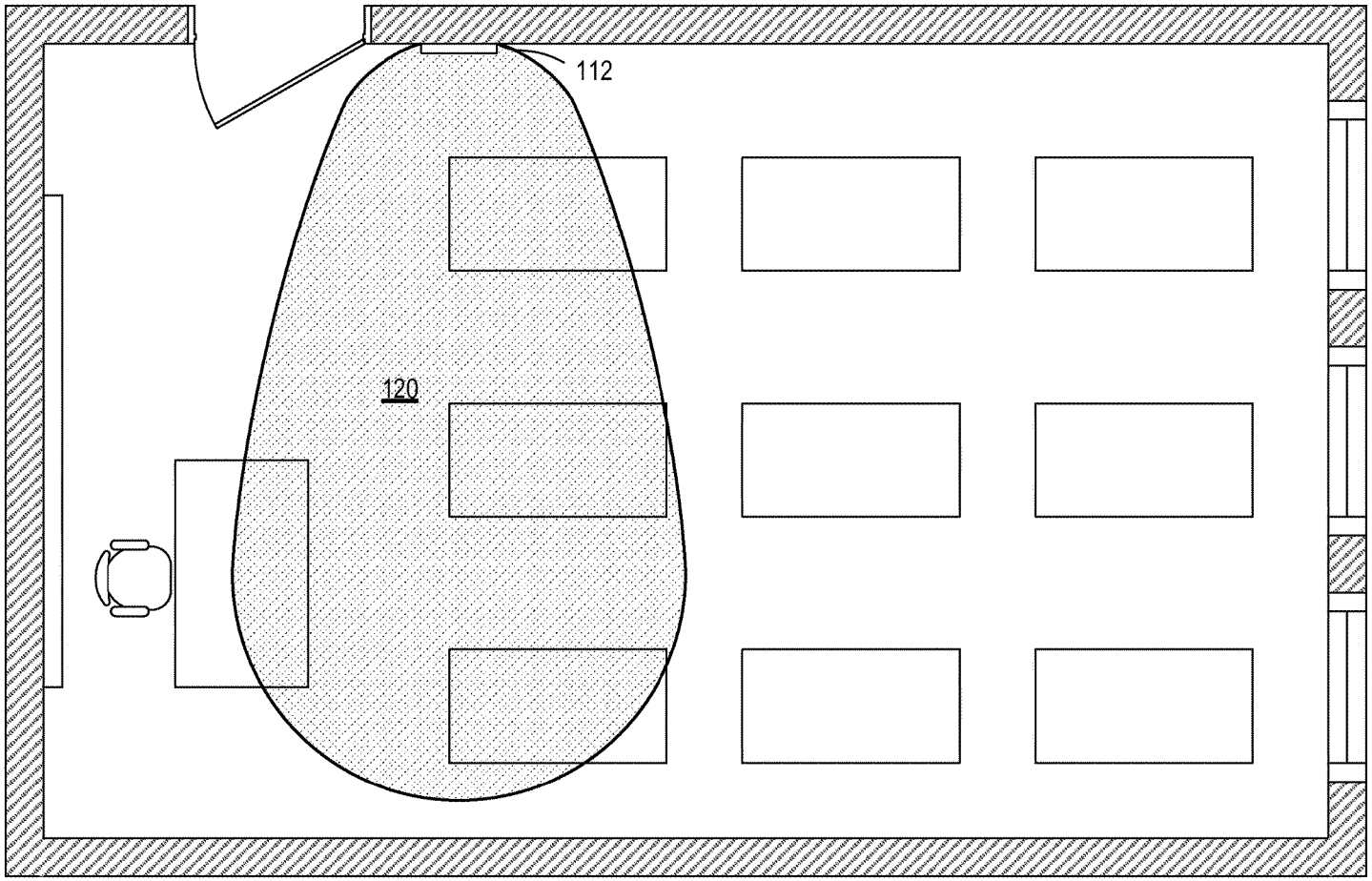
Fig. 1 (Prior Art)
FIG. 1 is a diagram of a room illustrating a detection range of a prior art ultrasonic occupancy sensor.
Figure 2:
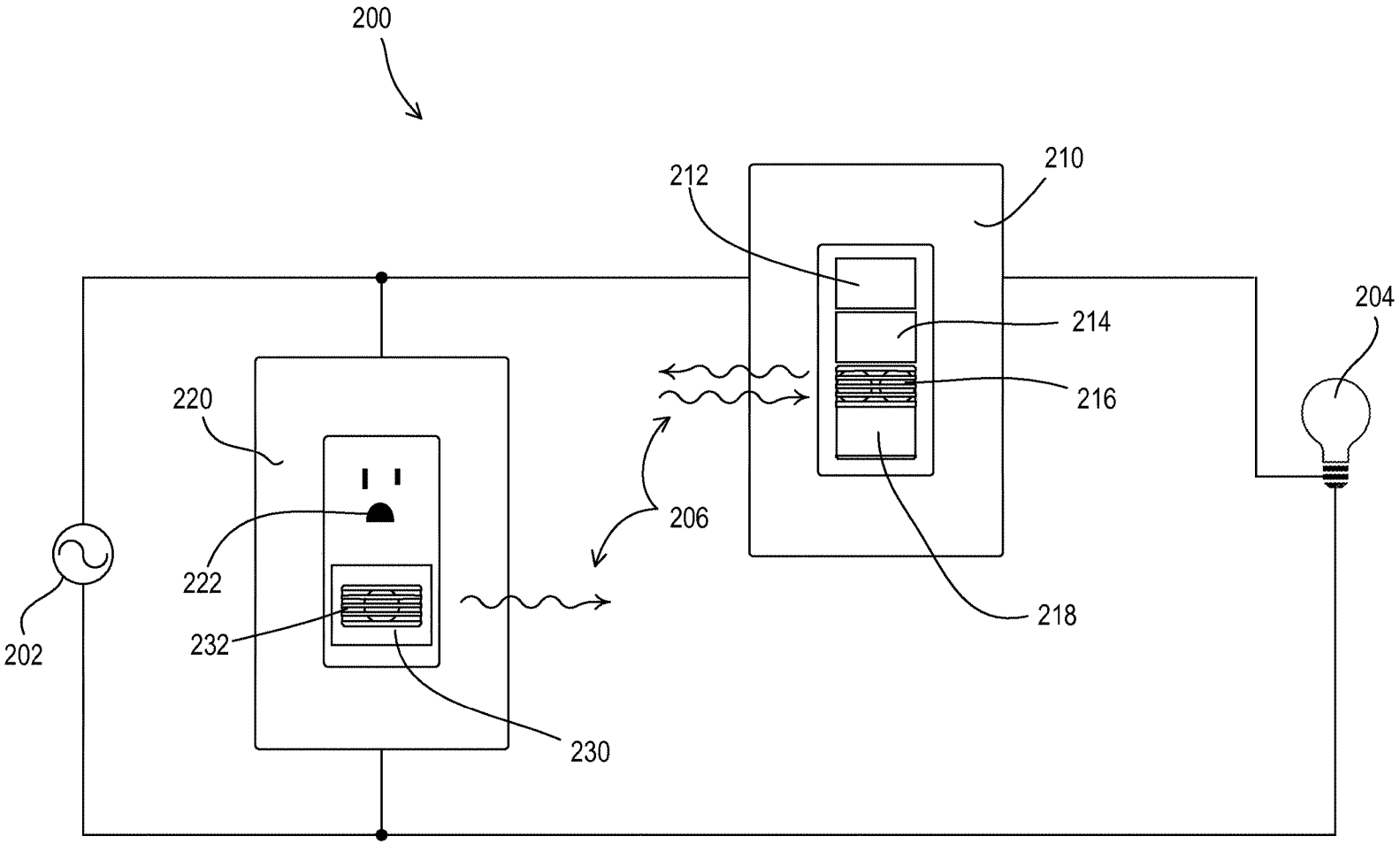
FIG. 2 is a simple diagram of an example of a load control system (e.g., an ultrasonic sensing system) comprising a load control device (e.g., an ultrasonic sensor) and a remote ultrasonic transmitter.

FIG. 2 is a simple diagram of an example of a load control system 200 (e.g., an ultrasonic sensing system) comprising a load control device 210 (e.g., an ultrasonic sensor) and a remote ultrasonic transmitter 230. The load control device 210 may be adapted to be coupled in series electrical connection between an alternating-current (AC) power source 202 and an electrical load (e.g., a lighting load 204) for controlling the power delivered to the lighting load. For example, the load control device 210 may be adapted to be wall-mounted in a standard electrical wallbox. The load control device 210 may be implemented as a table-top load control device. The load control device 210 may operate as an electronic switch to simply turn on and off the lighting load 204. The load control device 210 may operate as a dimmer switch to adjust the amount of power delivered to the lighting load 204 and the intensity of the lighting load. The load control device 210 may be coupled to the neutral side of the AC power source 202 and/or an earth ground connection.

As shown in FIG. 2, the load control device 210 may include two actuators, e.g., an on button 212 and an off button 214, for respectively turning the electrical load on and off. The load control device 210 may include a single toggle actuator for turning the electrical load on and off, for example, in response to successive actuations. The load control device 210 may include an intensity adjustment actuator (not shown) to allow for adjustment of the intensity of the lighting load 204. The load control device 210 may include one or more visual indicators (not shown), such as light-emitting diodes (LEDs) arranged in a linear array and illuminated to provide feedback of the intensity of the lighting load 204. The load control device 210 may be configured to raise the intensity of the lighting load 204 in response to actuations of the upper button (e.g., the on button 212) and to lower the intensity of the lighting load 204 in response to actuations of the lower button (e.g., the off button 214).

The load control device 210 may operate as an occupancy sensor to turn the lighting load 204 on in response to the presence of an occupant in the vicinity of the load control device (e.g., an occupancy condition), or off in response to the absence of the occupant (e.g., a vacancy condition). The load control device 210 may include an internal ultrasonic occupancy detection circuit operable to transmit and receive ultrasonic waves 206 via an acoustic grill 216 (e.g., a vent) for detecting the presence or absence of the occupant. The load control device 210 may be operable to determine whether an occupancy condition or a vacancy condition is presently occurring in the space in response to the ultrasonic waves received by the ultrasonic occupancy detection circuit, as will be described in greater detail below. The load control device 210 may operate as a vacancy sensor. When operating as a vacancy sensor, the load control device 210 may only operate to turn off the lighting load 204 in response to detecting a vacancy condition in the space. For example, the load control device 210 would not turn on the lighting load 204 in response to detecting an occupancy condition. When the load control device 210 operates as a vacancy sensor, the lighting load 204 must be turned on manually (e.g., in response to a manual actuation of the on button 212).

The load control device 210 may include an internal passive infrared (PIR) occupancy detection circuit for detecting the presence or absence of the occupant, i.e., the load control device 210 may be a dual-tech occupancy sensor. The load control device 210 may include a lens 218 for directing the infrared energy from the occupant to the internal PIR occupancy detection circuit. Examples of occupancy and vacancy sensors having PIR occupancy detection circuits are described in greater detail in commonly-assigned U.S. Pat. No. 8,009,042, issued Aug. 30, 2013, entitled RADIO-FREQUENCY LIGHTING CONTROL SYSTEM WITH OCCUPANCY SENSING, the entire disclosure of which is hereby incorporated by reference. The load control device 210 may include a microwave detector, or any suitable detector or combination of detectors, for detecting the presence or absence of the occupant.

Figure 3:
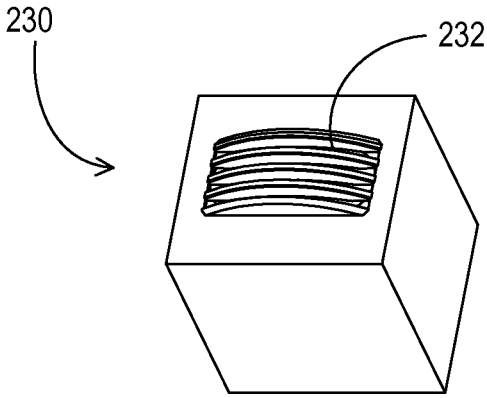
FIG. 3 is an example perspective view of a remote ultrasonic transmitter.
Figure 4:
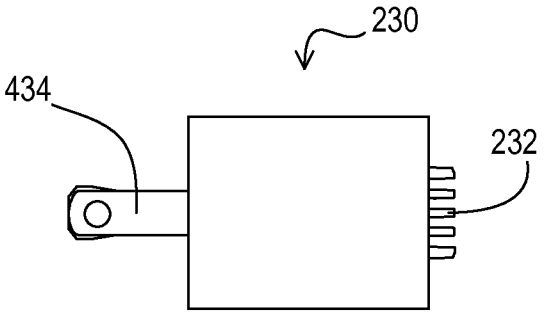
FIG. 4 is an example left side view of the remote ultrasonic transmitter of FIG. 3.

The load control system 200 may include an electrical outlet 220 that is coupled in parallel with the AC power source 202 and has, for example, two electrical receptacles 222. The remote ultrasonic transmitter 230 may be plugged into one of the electrical receptacles 222 of the electrical outlet 220 as shown in FIG. 2. FIG. 3 is an example perspective view, and FIG. 4 is an example left side view of the remote ultrasonic transmitter 230. The ultrasonic transmitter 230 may be operable to transmit ultrasonic waves 206 via an acoustic grill 232 (e.g., a vent). The ultrasonic waves 206 transmitted by the ultrasonic transmitter 230 may be received by the ultrasonic occupancy detection circuit of the load control device 210 for improving the ability of the load control device to detect the presence or absence of the occupant, as described herein. The ultrasonic transmitter may have electrical prongs 434 (e.g., blades) adapted to be plugged into the electrical receptacle 222, such that the ultrasonic transmitter 230 may be powered from the AC power source 202. The ultrasonic transmitter 230 may be battery powered and located at a position distinct from the electrical outlet 220. The ultrasonic transmitter 230 may be powered by an external direct-current (DC) power supply (not shown) plugged into the electrical outlet 220, or plugged into a Universal Serial Bus (USB) port on a device capable of supplying power to the ultrasonic transmitter.

Figure 5A:
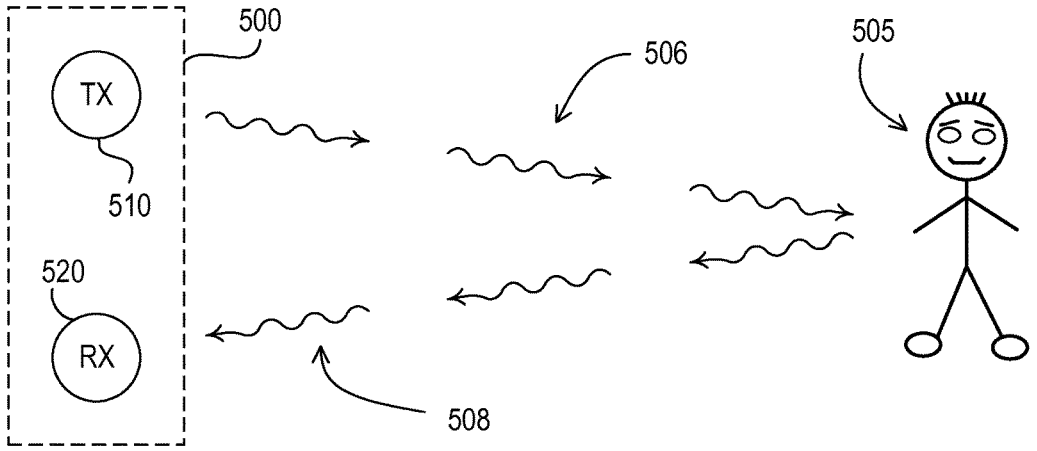
FIG. 5A is a diagram illustrating ultrasonic waves transmitted by an ultrasonic transmitter and received by an ultrasonic receiver located in a single device, where the ultrasonic waves are reflected off of an occupant.
Figure 5B:
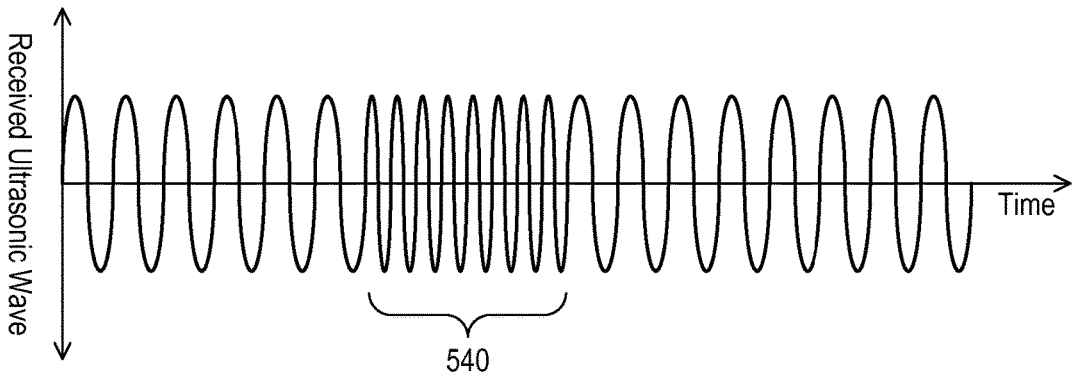
FIG. 5B is an example waveform of the ultrasonic waves of FIG. 5A as reflected off of the occupant.

FIG. 5A is a diagram illustrating ultrasonic waves 506, 508 transmitted by an ultrasonic transmitter 510 and received by an ultrasonic receiver 520 located in a single device 500 (e.g., the load control device 200 shown in FIG. 2). The transmitted ultrasonic waves 506 are emitted by the ultrasonic transmitter 510 and are reflected off of an occupant 505. FIG. 5B is an example waveform of the received (e.g., reflected) ultrasonic waves 508 as reflected off of the occupant 505. The example waveform of the received ultrasonic waves 508 shown in FIG. 5B is characterized by a period 540 of frequency modulation (e.g., a Doppler shift) due to the reflection off of the occupant 505. The ultrasonic transmitter 510 may continuously transmit ultrasonic waves. When ultrasonic waves 506 reflect off of an occupant 505, the ultrasonic waves experience a frequency modulation which the ultrasonic receiver 520 detects. The load control device may be responsive to the frequency modulation of the received ultrasonic waves that is detected by the ultrasonic receiver 520.

Figure 6A:
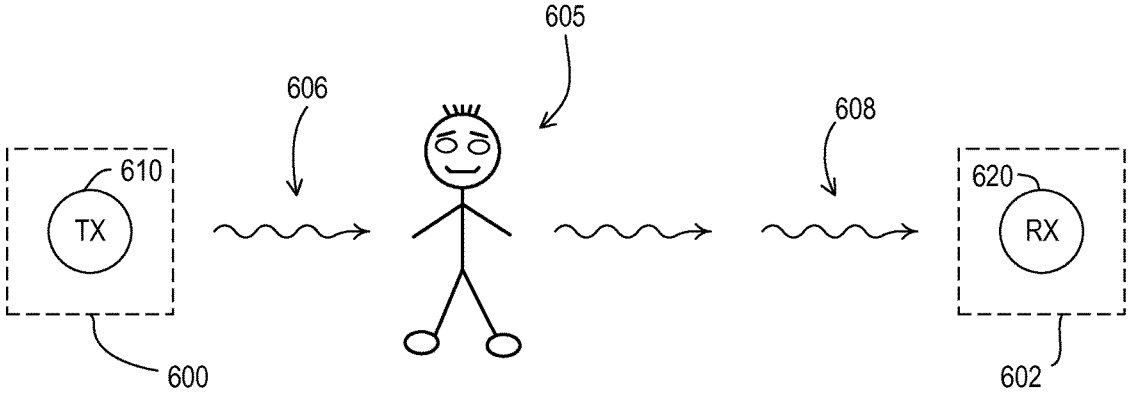
FIG. 6A is a diagram illustrating ultrasonic waves transmitted by an ultrasonic transmitter located in a first device and ultrasonic waves received by an ultrasonic receiver located in a second device, where the ultrasonic waves are attenuated by an occupant.

FIG. 6A is a diagram illustrating ultrasonic waves 606 transmitted by an ultrasonic transmitter 610 located in a first device 600 (e.g., the ultrasonic transmitter 230 of FIG. 2) and ultrasonic waves 608 received by an ultrasonic receiver 620 located in a second device 602 (e.g., the load control device 200 of FIG. 2). The ultrasonic transmitter 610 may continuously transmit ultrasonic waves 606. The transmitted ultrasonic waves 606 may be emitted by the ultrasonic transmitter 610. The ultrasonic waves 606 may be momentarily attenuated by an occupant 605.

Figure 6B:
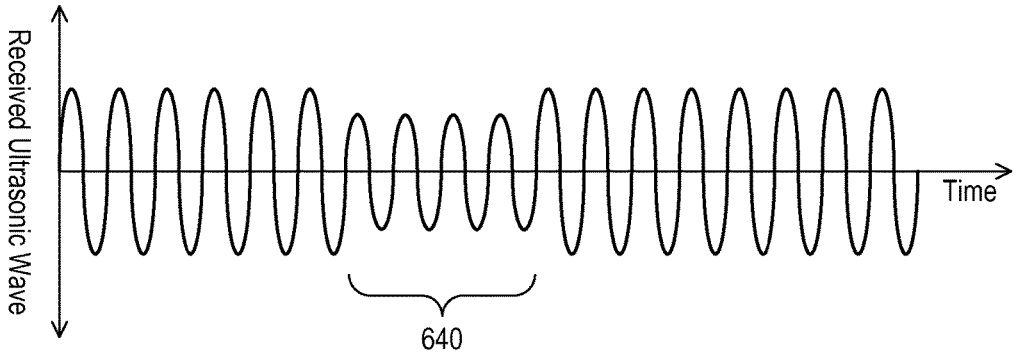
FIG. 6B is an example waveform of the ultrasonic waves of FIG. 6A as attenuated by the occupant.

FIG. 6B is an example waveform of the received ultrasonic waves 608 as attenuated by the occupant 605. The example waveform of the received ultrasonic waves 608 shown in FIG. 6B may be characterized by a period 640 of amplitude modulation due to the attenuation by the occupant 605. The received ultrasonic waves 608 may also be characterized by a Doppler shift.

Figure 7:
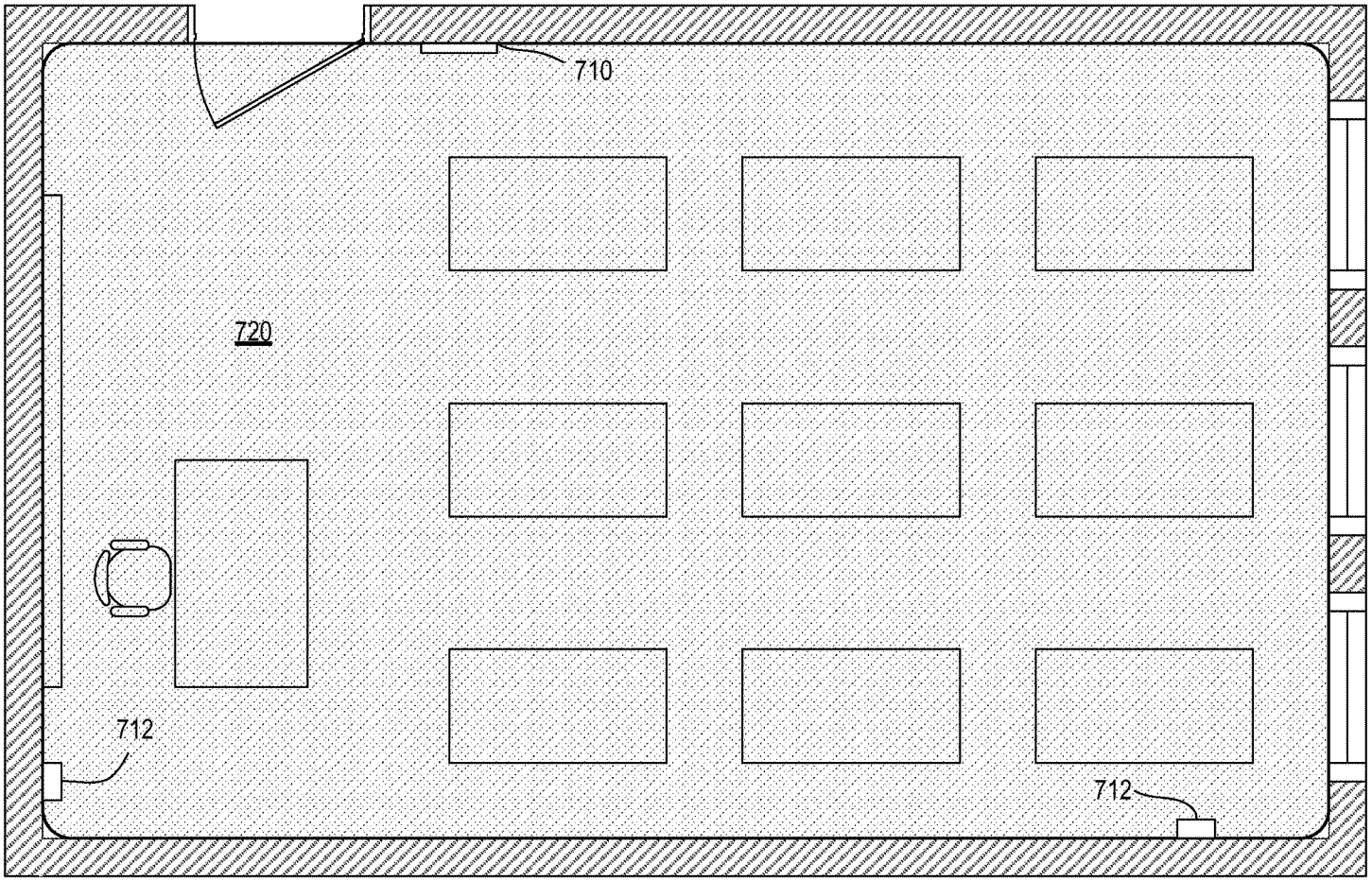
FIG. 7 is a diagram of a room illustrating a detection range of an example ultrasonic sensing system having a load control device and at least one ultrasonic transmitter.

FIG. 7 is a diagram of a room 700 (e.g., a classroom) illustrating a detection range 720 of an example ultrasonic sensing system (e.g., the load control system 200 of FIG. 2). The ultrasonic sensing system installed in the room 700 may have a wall-mounted ultrasonic sensor 710 (e.g., the load control device 210 of FIG. 2) and two ultrasonic transmitters 712 (e.g., the ultrasonic transmitter 230 of FIG. 2 and/or the ultrasonic transmitter 610 of FIG. 6A). For example, the wall-mounted ultrasonic sensor 710 may be mounted in an electrical wallbox and may be coupled in series electrical connection between an AC power source and an electrical load (e.g., the lights of the room 700) for turning the electrical load on and off. The wall-mounted ultrasonic sensor 710 may include an ultrasonic transmitter (e.g., the ultrasonic transmitter 510 of FIG. 5A) and an ultrasonic receiver (e.g., the ultrasonic receiver 520 of FIG. 5A and/or the ultrasonic receiver 620 of FIG. 6A). The ultrasonic waves transmitted by the ultrasonic transmitter of the wall-mounted ultrasonic sensor 710 may be reflected off of an occupant of the room 700 and received by the ultrasonic receiver of the wall-mounted ultrasonic sensor 710 (e.g., as shown in FIGS. 5A and 5B).

The ultrasonic transmitters 712 are simple, low-cost devices and operate to transmit the ultrasonic waves. The ultrasonic transmitters 712 may be spaced about the room 700 and may be, for example, plugged into electrical outlets in the room. The ultrasonic transmitters 712 may be located on a surface, such as a tabletop or a chair, or in a wallbox housing a switch for an LED light bulb (e.g., as described with reference to FIG. 13). The ultrasonic waves transmitted by the ultrasonic transmitters 712 may be momentarily attenuated by an occupant of the room 700 and received by the ultrasonic receiver of the wall-mounted ultrasonic sensor 710 (e.g., as shown in FIGS. 6A and 6B). The resulting detection range 720 of the example ultrasonic sensing system having the wall-mounted ultrasonic sensor 710 and the two ultrasonic transmitters 712 may include, for example, substantially all of the area of the room 700 as shown in FIG. 7. Since the ultrasonic transmitters 712 are simple, low-cost devices, the ultrasonic transmitters allow for an increased detection range (e.g., detection range 720) without greatly increasing the total cost of the ultrasonic sensing system since multiple wall-mounted ultrasonic sensors do not need to be installed around the room 700.

Figure 8:
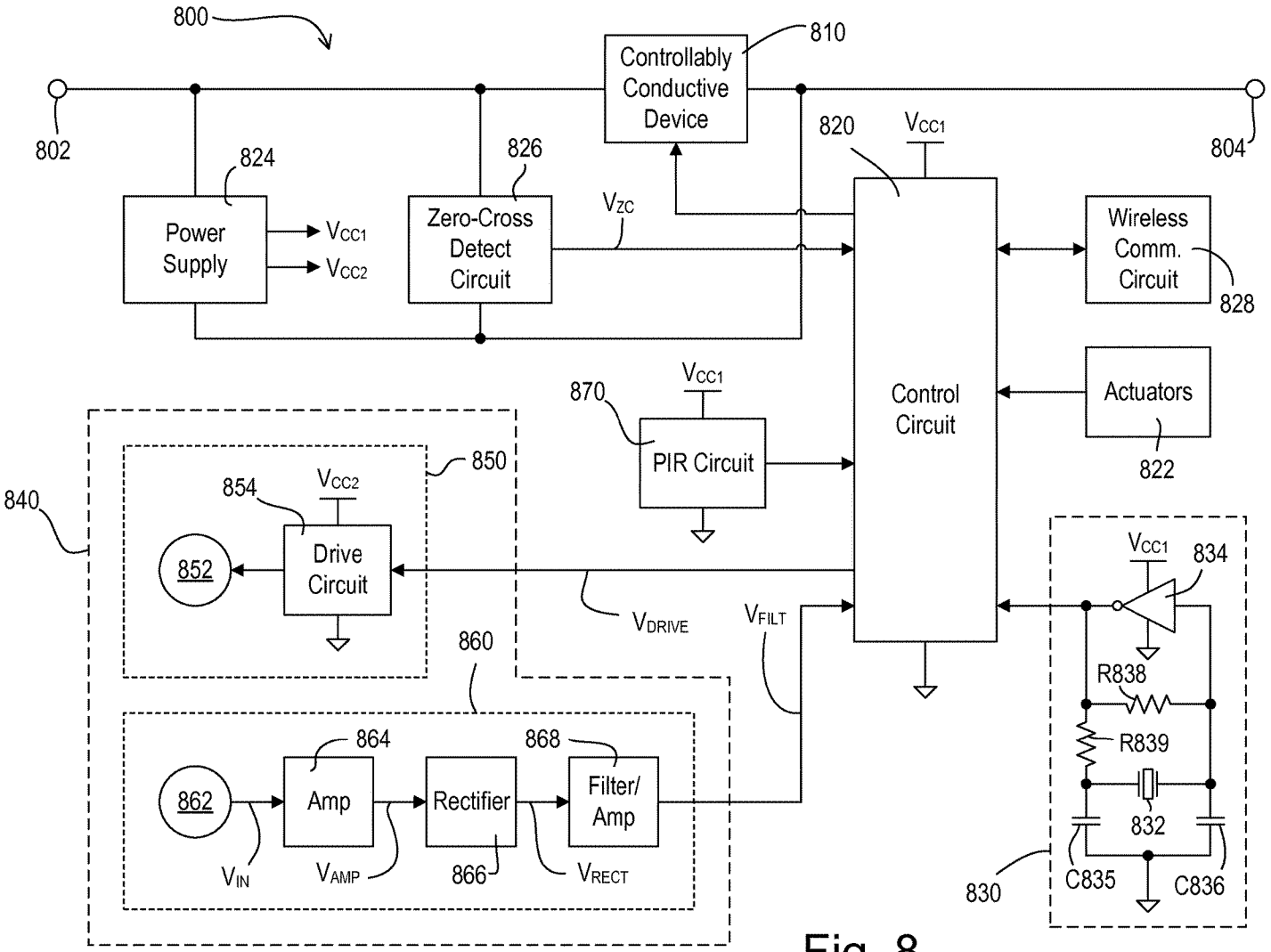
FIG. 8 is a simplified block diagram of an example load control device (e.g., an ultrasonic sensor).

FIG. 8 is a simplified block diagram of an example load control device 800 (e.g., the load control device 210 of FIG. 2 and/or the wall-mounted ultrasonic sensor 710 of FIG. 7). The load control device 800 may include a first electrical connection (e.g., a hot terminal 582) adapted to be coupled to an AC power source (e.g., the AC power source 202 of FIG. 2) and a second electrical connection (e.g., a load terminal 804) adapted to be coupled to an electrical load (e.g., the lighting load 204 of FIG. 2). The load control device 800 may include a neutral terminal (not shown) adapted to be coupled to the neutral side of the AC power source and/or an earth ground connection (not shown) adapted to be coupled to earth ground.

The load control device 800 may include a controllably conductive device 810 coupled in series electrical connection between the hot terminal 802 and the load terminal 804 for controlling the power delivered to the electrical load. The controllably conductive device 810 may include, for example, a relay, a bidirectional semiconductor switch (such as, a triac, a FET in a rectifier bridge, two FETs in anti-series connection, or one or more insulated-gate bipolar junction transistors), or any other suitable switching circuit.

The load control device 800 may include a control circuit 820 that is coupled to the controllably conductive device 810 for rendering the controllably conductive device conductive and/or non-conductive to control the power delivered to the electrical load. For example, the control circuit 820 may include a microcontroller, a programmable logic device (PLD), a microprocessor, an application specific integrated circuit (ASIC), a field-programmable gate array (FPGA), or any suitable processing device, controller, or control circuit. The control circuit 820 may receive inputs from actuators 822 (e.g., the on button 212 and the off button 214 of the load control device of FIG. 2). The control circuit 820 may be coupled to a memory (not shown) for storage of the operational characteristics of the load control device 800. The memory may be implemented as an external integrated circuit (IC) or as an internal circuit of the control circuit 820. A power supply 824 may generate a first DC supply voltage $V_{CC1}$ (e.g., approximately 3 volts) for powering the control circuit 820. The power supply 824 may generate a second DC supply voltage $V_{CC2}$ (e.g., approximately 12 volts) for powering other circuitry of the load control device 800, for example, as described herein.

A zero-cross detect circuit 826 may be coupled between the hot terminal 802 and the load terminal 804. The zero-cross detect circuit 826 may generate a zero-cross control signal $V_{ZC}$. The zero-cross control signal $V_{ZC}$ may be representative of the zero-crossings of an AC source voltage of the AC power source. A zero-crossing may be defined at the time at which the AC source voltage transitions from positive to negative polarity, at the time at which the AC source voltage transitions from negative to positive polarity, or at the beginning of each half-cycle. The zero-cross control signal $V_{ZC}$ may be received by the control circuit 820. The control circuit 820 may control the controllably conductive device 810 to be conductive and/or non-conductive at predetermined times relative to the zero-crossing points of the AC source voltage.

The load control device 800 may include a wireless communication circuit 828, for example, including a radio-frequency (RF) transceiver coupled to an antenna for transmitting and receiving wireless signals (e.g., RF signals from a remote ultrasonic receiver or a remote ultrasonic transmitter). The communication circuit 828 may comprise an RF transmitter for transmitting RF signals, an RF receiver for receiving RF signals, or an infrared (IR) transmitter and/or receiver for transmitting and/or receiving IR signals. The wireless communication circuit 828 may be in electrical communication with the control circuit 820 of the load control device 800, such that one or more wireless signals received from the ultrasonic receiver may cause the load control device to adjust the lighting on or off. The antenna of the wireless communication circuit 828 may be enclosed in the housing of the load control device 800 or coupled to the exterior portion of the housing.

The control circuit 820 may be coupled to a low phase-noise oscillator circuit 530 for setting an internal operating frequency for of the control circuit (e.g. approximately 40 kHz±2 Hz). The low phase-noise oscillator circuit 830 may include, for example, a Pierce oscillator circuit (as shown in FIG. 8) having a crystal 832, such as a 40-kHz piezoelectric crystal, e.g., part number CM250C, manufactured by Citizen Crystal. For example, the low phase-noise oscillator circuit 830 may be characterized by a spectral purity of approximately −60 dBc at 5 Hz from the rated frequency (i.e., 40 kHz±2 Hz). The low phase-noise oscillator circuit 830 may include an inverter 834, two capacitors C835, C836 (e.g., each having a capacitance of approximately 12 pF), and two resistors R838, R839 (e.g., having resistances of approximately 10 MΩ and 392 kΩ, respectively). The low phase-noise oscillator circuit 830 may include any suitable external low phase-noise oscillator circuit, or an internal low phase-noise oscillator circuit of the control circuit 820.

The load control device 800 may include an ultrasonic sensing circuit 840 having an ultrasonic transmitting circuit 850 and an ultrasonic receiving circuit 860. The ultrasonic transmitting circuit 850 may include a drive circuit 854 (e.g., an H-bridge drive circuit). The drive circuit 854 may receive the second DC supply voltage $V_{CC2}$ for energizing a piezoelectric element 852, for example, in order to transmit ultrasonic waves from the load control device 800 (e.g., via an acoustic grill, such as the acoustic grill 216 of the load control device 200 shown in FIG. 2). The control circuit 820 may drive the drive circuit 854 with an ultrasonic drive signal $V_{DRIVE}$, such as a square wave signal having an ultrasonic transmission frequency $f_{OP}$ that may be equal to the operating frequency $f_{OP}$ of the control circuit (e.g., approximately 40 kHz±2 Hz). Since the operating frequency for of the control circuit 820 is derived from the low phase-noise oscillator circuit 830, the ultrasonic drive signal $V_{DRIVE}$ and the ultrasonic transmission frequency $f_{US}$ may be characterized by low phase noise.

The ultrasonic receiving circuit 860 may include a piezoelectric element 862. The piezoelectric element 862 may generate a received ultrasonic input signal $V_{IN}$ in response to the received ultrasonic waves (e.g., the received ultrasonic waves shown in FIGS. 5B and 6B). The input signal $V_{IN}$ may be received by an amplifier 864 (e.g., a non-linear amplifier). The amplifier 864 may generate an amplified signal $V_{AMP}$ and may be characterized by a gain of approximately 20 dB. The ultrasonic receiving circuit 860 may include a rectifier circuit 866 (e.g., an asynchronous rectifier). The rectifier circuit 866 may receive the amplified signal $V_{AMP}$ from the amplifier circuit 864 and generate a rectified signal $V_{RECT}$. For example, the rectifier circuit 866 may include a diode feeding the parallel combination of a resistor and a capacitor. Since the ultrasonic receiving circuit 860 of the load control device 800 may receive some of the unreflected ultrasonic waves transmitted by the ultrasonic transmitting circuit 850, the magnitude of the amplified signal $V_{AMP}$ received by the rectifier circuit 866 may be greater than the forward drop of the diode of the rectifier circuit, such that the rectifier circuit may properly generate the rectified signal $V_{RECT}$. The rectifier circuit 866 may include a synchronous rectifier as described in commonly-assigned U.S. Pat. No. 8,514,075, issued Aug. 20, 2013, entitled ULTRASONIC RECEIVING CIRCUIT, the entire disclosure of which is hereby incorporated by reference.

A filter and amplifier circuit 868 (e.g., an anti-aliasing filter, such as a bandpass filter) may generate a filtered signal $V_{FILT}$ from the rectified signal $V_{RECT}$. The filter and amplifier circuit 868 may have a bandwidth of approximately 50-500 Hz. The filter and amplifier 868 may be characterized by a gain of approximately 60 dB. The control circuit 820 may receive the filtered signal $V_{FILT}$ from the filter and amplifier circuit 868. The control circuit 820 may sample the filtered signal using, for example, an analog-to-digital converter (ADC). The control circuit 820 is operable to detect the presence of the occupant in the space, for example, if the magnitude of the filtered signal $V_{FILT}$ rises above an upper voltage threshold or falls below a lower voltage threshold. In addition, the control circuit 820 may be operable to digitally filter the filtered signal $V_{FILT}$ received from the filter and amplifier circuit 868 to provide additional filtering of the signal before determining if the space is occupied or unoccupied.

The load control device 800 may include a passive infrared (PIR) sensing circuit 870, e.g., comprising a pyroelectric infrared detector for receiving infrared energy of the occupant through a lens of the load control device (e.g., the lens 218 of the load control device 200 shown in FIG. 2). The PIR sensing circuit 870 may generate a PIR sense signal $V_{PIR}$ representative of the magnitude of the received infrared energy. The control circuit 820 may analyze both the filtered signal $V_{FILT}$ received from the ultrasonic receiving circuit 860 and the PIR sense signal $V_{PIR}$ received from the PIR sensing circuit 870, for example, to determine if an occupancy condition or a vacancy condition is presently occurring in the space. Examples of PIR sensing circuits are described in greater detail in commonly-assigned U.S. Pat. No. 8,228,184, issued Jul. 24, 2012, entitled BATTERY-POWERED OCCUPANCY SENSOR, the entire disclosure of which is hereby incorporated by reference.

Figure 9:
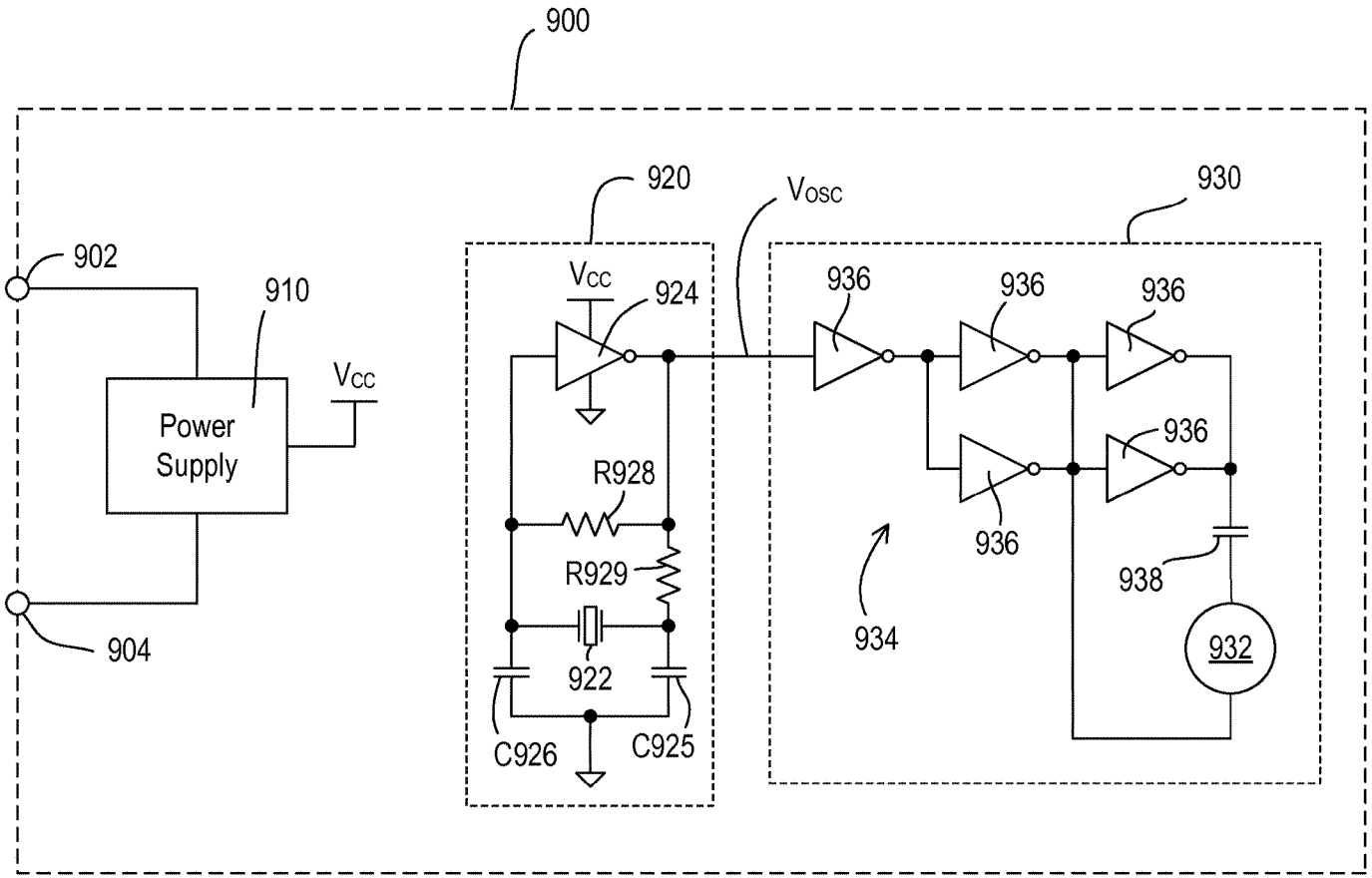
FIG. 9 is a simplified block diagram of an example remote ultrasonic transmitter.

FIG. 9 is a simplified block diagram of an example remote ultrasonic transmitter 900 (e.g., the remote ultrasonic transmitter 230 of FIG. 2 and/or the ultrasonic transmitters 712 of FIG. 7). The ultrasonic transmitter 900 may include a power supply 910 operable to receive power via electrical connections 902, 904. The ultrasonic transmitter 900 may include a power supply 910 to generate a DC supply voltage $V_{CC}$ (e.g., approximately 12 volts). For example, the electrical connections 902, 904 may have prongs (e.g., the prongs 434 shown in FIG. 4) adapted to be plugged into a receptacle of an electrical outlet for powering the ultrasonic transmitter 900 from an AC power source. The power supply 910 may be operable to convert the AC source voltage of the AC power source to the DC supply voltage $V_{CC}$. The electrical connections 902, 904 may be adapted to be coupled to an external DC power supply for receiving a DC source voltage. The power supply 910 may be a DC-to-DC converter for converting the DC source voltage to the DC supply voltage $V_{CC}$. The power supply 910 may be replaced by one or more batteries.

The ultrasonic transmitter 900 may include a low phase-noise oscillator circuit 920, such as for driving an ultrasonic transmitting circuit 930. The oscillator circuit 920 may generate an oscillating signal $V_{OSC}$ (e.g., a square wave) at an ultrasonic transmission frequency $f_{US}$ (e.g., approximately 40 kHz±2 Hz) for driving the ultrasonic transmitting circuit 930. As shown in FIG. 9, the oscillator circuit 920 may comprise, for example, a Pierce oscillator circuit having a crystal 922, such as a 40-kHz piezoelectric crystal, e.g., part number CM250C, manufactured by Citizen Crystal. For example, the low phase-noise oscillator circuit 920 may be characterized by a spectral purity of approximately −60 dBc at 5 Hz from the rated frequency (i.e., 40 kHz±2 Hz). The low phase-noise oscillator circuit 920 may include an inverter 924, two capacitors C925, C926 (e.g., each having a capacitance of approximately 12 pF), and two resistors R628, R629 (e.g., having resistances of approximately 10 MΩ and 392 kΩ, respectively). The oscillating signal $V_{OSC}$ may be generated at an output of the oscillator circuit 920 (e.g., the output of the inverter 924).

The ultrasonic transmitting circuit 930 may include a drive circuit 932 for energizing a piezoelectric element 934, for example, to transmit ultrasonic waves from the ultrasonic transmitter 900 (e.g., through an acoustic grill, such as the acoustic grill 232 of the ultrasonic transmitter 230 shown in FIG. 2). The drive circuit 932 may receive the oscillating signal $V_{OSC}$ from the oscillator circuit 920 (e.g., the drive circuit 932 may be directly driven by the output of the oscillator circuit). The drive circuit 932 may have a plurality of inverters 936 that may be coupled to the piezoelectric element 934, for example, to generate the ultrasonic waves at the ultrasonic transmission frequency $f_{US}$. The piezoelectric element 934 may be coupled in series with a capacitor 938 (e.g., having a capacitance of approximately 1 μF). The inverter 924 of the oscillator circuit 920 and the inverters 936 of the ultrasonic transmitter circuit 930 may be implemented on a single integrated circuit (e.g., part number CD4049UB, manufactured by Texas Instruments), which may be powered by the DC supply voltage $V_{CC}$.

Figure 10:
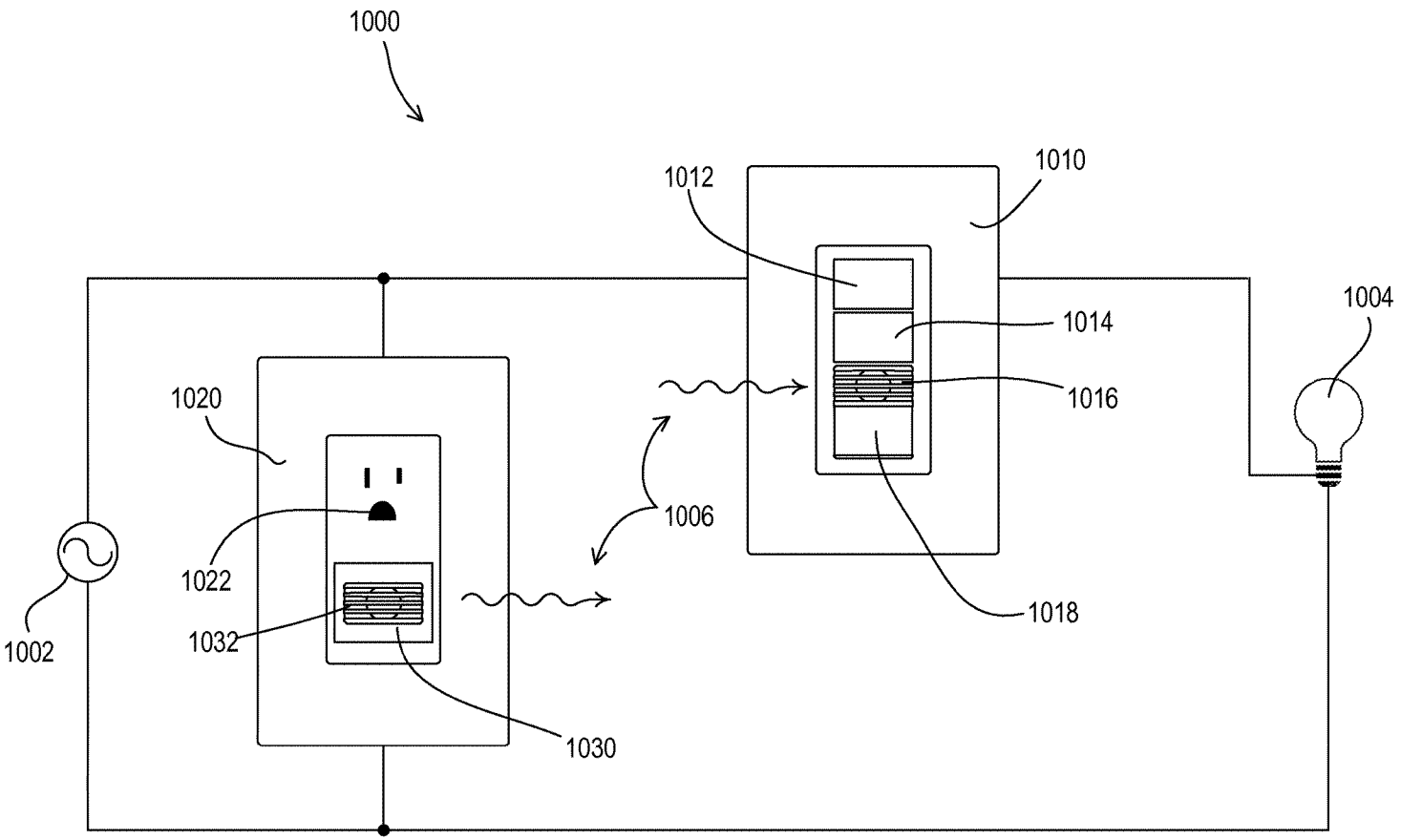
FIG. 10 is a simple diagram of another example of a load control system (e.g., an ultrasonic sensing system) comprising a load control device (e.g., an ultrasonic receiver) and a remote ultrasonic transmitter.

FIG. 10 is a simple diagram of another example of a load control system 1000 (e.g., an ultrasonic sensing system)

comprising a load control device 1010 (e.g., an ultrasonic receiver) and a remote ultrasonic transmitter 1030 (e.g., the ultrasonic transmitter 900 shown in FIG. 9). The load control device 1010 may be adapted to be coupled in series electrical connection between an AC power source 1002 and an electrical load (e.g., a lighting load 1004) for controlling the power delivered to the lighting load. The remote ultrasonic transmitter 1030 may be operable to be plugged into a receptacle 1022 of an electrical outlet 1020. The remote ultrasonic transmitter 1030 may transmit ultrasonic waves 1006 via an acoustic grill 1032 at an ultrasonic transmission frequency $f_{US}$ (e.g., approximately 40 kHz±2 Hz).

The load control system 1000 of FIG. 10 may be similar to the load control system 200 shown in FIG. 2. The load control device 1010 of the load control system 1000 of FIG. 10 may include an ultrasonic occupancy detection circuit having an ultrasonic receiver, such that the load control system 1000 operates, for example, as shown in FIGS. 6A and 6B. Because the load control device 1010 may not have an ultrasonic transmitter and the ultrasonic receiver of the load control device may only receive the ultrasonic waves transmitted by the remote ultrasonic transmitter 1030 (e.g., ultrasonic waves having small magnitudes), the ultrasonic receiver includes a synchronous rectifier. The synchronous rectifier may be responsive to small signals, as described herein. The ultrasonic receiver of the load control device 1010 may be operable to receive ultrasonic waves via an acoustic grill 1016. The load control device 1010 may include a PIR occupancy detection circuit operable to detect the presence of an occupant via infrared energy received through a lens 1018. The load control device 1010 may be operable to turn the lighting load 1004 on and off in response to the ultrasonic occupancy detection circuit and/or the PIR occupancy detection circuit (e.g., as described above with reference to the load control device 800 of FIG. 8). The load control device 1010 may have an on button 1012 and an off button 1014 to provide manual control of the lighting load 1004.

Figure 11:
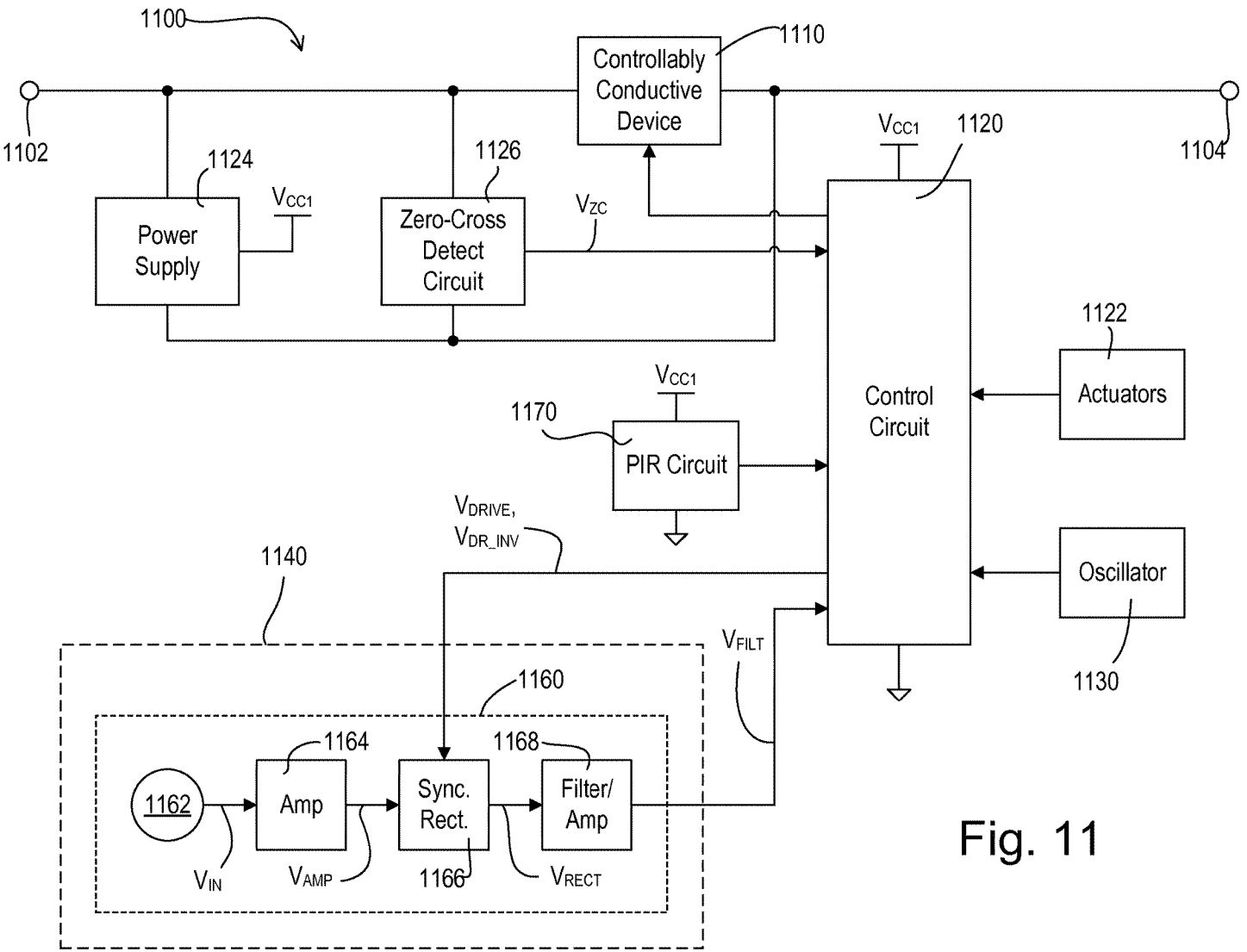
FIG. 11 is a simplified block diagram of another example load control device.

FIG. 11 is a simplified block diagram of a load control device 1100 (e.g., the load control device 1010 of FIG. 10). The load control device 1100 may include a hot terminal 1102 adapted to be coupled to an AC power source (e.g., the AC power source 1002 of FIG. 10). The load control device 1100 may include a load terminal 1104 adapted to be coupled to an electrical load (e.g., the lighting load 1004 of FIG. 10). The load control device 1100 may include a controllably conductive device 1110 coupled in series electrical connection between the hot terminal 1102 and the load terminal 1104, for example, to control the power delivered to the electrical load. The controllably conductive device 1110 may comprise, for example, a relay, a bidirectional semiconductor switch (such as, a triac, a FET in a rectifier bridge, two FETs in anti-series connection, or one or more insulated-gate bipolar junction transistors), or any other suitable switching circuit.

The load control device 1100 may include a control circuit 1120 for controlling the controllably conductive device 1110 to be conductive and/or non-conductive to control the power delivered to the electrical load. For example, the control circuit 1120 may have a microcontroller, a programmable logic device (PLD), a microprocessor, an application specific integrated circuit (ASIC), a field-programmable gate array (FPGA), or any suitable processing device, controller, or control circuit. The control circuit 1120 may receive inputs from actuators 1122 (e.g., the on button 1012 and the off button 1014 of the load control device 1010 of FIG. 10). The control circuit 1120 may receive a zero-cross control signal $V_{ZC}$ that may be representative of the zero-crossings of an AC source voltage of the AC power source from a zero-cross detect circuit 1126. The control circuit 1120 may be coupled to an internal or external memory (not shown) for storage of the operational characteristics of the load control device 1100. The control circuit 1120 may be coupled to a low phase-noise oscillator circuit 1130 (e.g., similar to the low phase-noise oscillator circuit 820 shown in FIG. 8), for example, to set an internal operating frequency $f_{OP}$ of the control circuit (e.g., approximately 40 kHz±2 Hz). A power supply 1124 may generate a DC supply voltage $V_{CC}$ (e.g., approximately 3 volts) for powering the control circuit 1120 and/or other low-voltage circuitry of the load control device 1100.

Figure 12A:
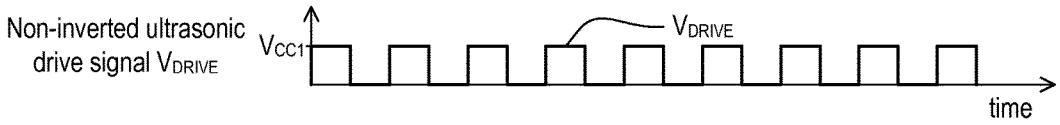
FIG. 12A shows an example waveform illustrating the operation of the ultrasonic receiving circuit 1160 when there may be a non-inverted ultrasonic drive signal $V_{DRIVE}$.

The load control device 1100 may have an ultrasonic sensing circuit 1140. The ultrasonic sensing circuit 1140 may include an ultrasonic receiving circuit 1160. For example, the ultrasonic sensing circuit 1140 may include an ultrasonic receiving circuit 1160. FIG. 12A shows an example waveform illustrating the operation of the ultrasonic receiving circuit 1160 when there may be a non-inverted ultrasonic drive signal $V_{DRIVE}$.

Figure 12B:
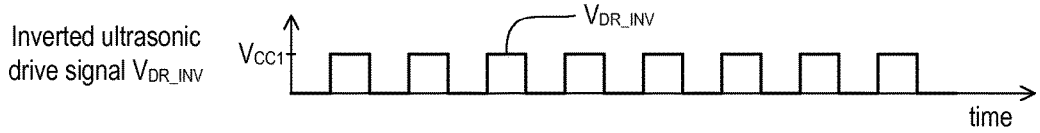
FIG. 12B shows an example waveform illustrating the operation of the ultrasonic receiving circuit 1160 when there may be an inverted ultrasonic drive signal $V_{DR_INV}$.

FIG. 12B shows an example waveform illustrating the operation of the ultrasonic receiving circuit 1160 when there may be an inverted ultrasonic drive signal $V_{DR_INV}$.

Figure 12C:
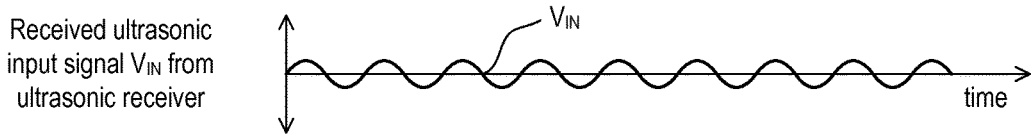
FIG. 12C shows an example waveform illustrating the operation of the ultrasonic receiving circuit 1160 when the ultrasonic receiving circuit 1160 may have received an ultrasonic input signal $V_{IN}$ from an ultrasonic receiver.

FIG. 12C shows an example waveform illustrating the operation of the ultrasonic receiving circuit 1160 when the ultrasonic receiving circuit 1160 may have received an ultrasonic input signal $V_{IN}$ from an ultrasonic receiver.

Figure 12D:
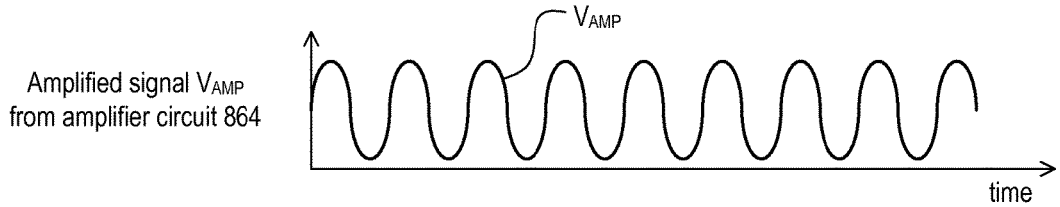
FIG. 12D shows an example waveform illustrating the operation of the ultrasonic receiving circuit 1160 when the ultrasonic receiving circuit 1160 may have received an amplified signal $V_{AMP}$ from the amplified circuit 1164.

FIG. 12D shows an example waveform illustrating the operation of the ultrasonic receiving circuit 1160 when the ultrasonic receiving circuit 1160 may have received an amplified signal $V_{AMP}$ from the amplified circuit 1164.

Figure 12E:
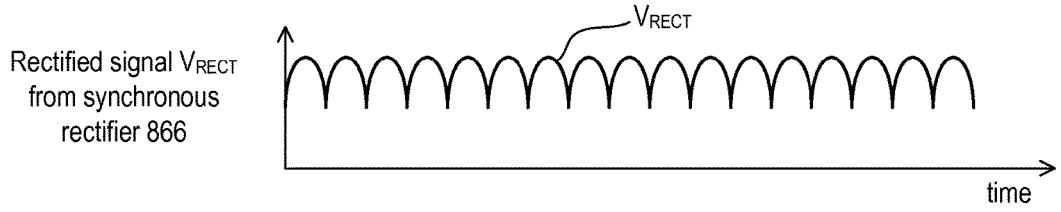
FIG. 12E shows an example waveform illustrating the operation of the ultrasonic receiving circuit 1160 when the ultrasonic receiving circuit 1160 may have received a rectified signal $V_{RECT}$ from the synchronous rectifier 1166.

FIG. 12E shows an example waveform illustrating the operation of the ultrasonic receiving circuit 1160 when the ultrasonic receiving circuit 1160 may have received a rectified signal $V_{RECT}$ from the synchronous rectifier 1166.

Figure 12F:
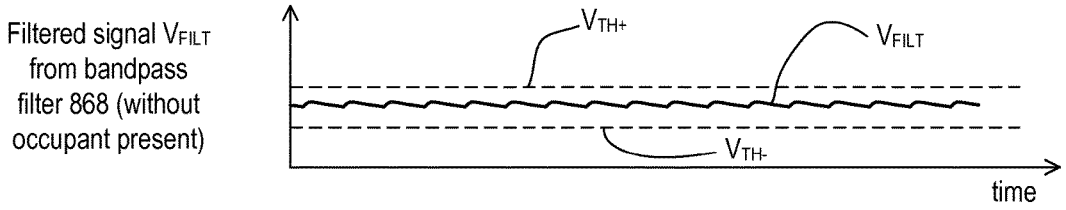
FIG. 12F shows example waveforms that illustrate the operation of an ultrasonic receiving circuit when there is not an occupant in a space.

FIG. 12F shows example waveform illustrating the operation of the ultrasonic receiving circuit 1160 when the space around the load control device 1100 is vacant. For example, FIG. 12F may show an example waveform illustrating the operation of the ultrasonic receiving circuit 1160 when the ultrasonic receiving circuit 1160 may have received a filtered signal $V_{FILT}$ from the bandpass filter 1168 without an occupant present.

Figure 12G:
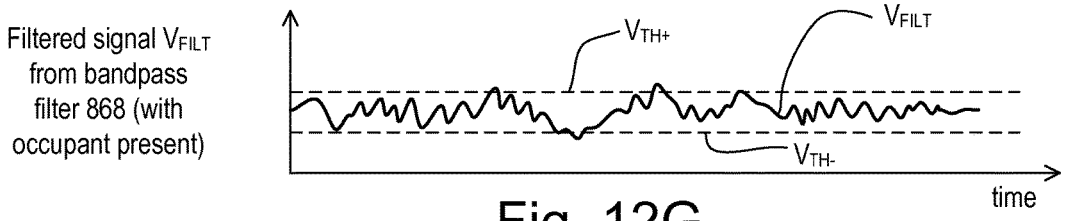
FIG. 12G shows an example waveform that illustrates the operation of an ultrasonic receiving circuit when there is an occupant in a space.

FIG. 12G shows an example waveform illustrating the operation of the ultrasonic receiving circuit 1160 when there is an occupant in the space. For example, FIG. 12G may show an example waveform illustrating the operation of the ultrasonic receiving circuit 1160 when the ultrasonic receiving circuit 1160 may have received a filtered signal $V_{FILT}$ from the bandpass filter 1168 with an occupant present.

The ultrasonic receiving circuit 1160 may have a piezoelectric element 1162. The piezoelectric element 1162 may generate a received ultrasonic input signal $V_{IN}$, for example, in response to the received ultrasonic waves (e.g., the received ultrasonic waves shown in FIGS. 6A and 6B). An amplifier circuit 1164 (e.g., a non-linear amplifier) may receive the input signal $V_{IN}$. The amplifier circuit 1164 may generate an amplified signal $V_{AMP}$ (e.g., as shown in FIG. 12F). A gain GNL of the amplifier circuit 1164 may be approximately 11, for example, when the magnitude of the AC component of the input signal $V_{IN}$ is small (e.g., less than approximately 1.2 volts), and approximately 2, for example, when the magnitude of the AC component of the input signal $V_{IN}$ is large (e.g., greater than approximately 1.2 volts).

The ultrasonic receiving circuit 1160 may include a synchronous rectifier 1166 (i.e., a lock-in amplifier). The synchronous rectifier 1166 may be responsive to signals having small magnitudes. The synchronous rectifier 1166 may receive the amplified signal $V_{AMP}$ from the amplifier circuit 1164. The synchronous rectifier 1166 may generate a rectified signal $V_{RECT}$, for example, as shown in FIG. 12E. The control circuit 1120 may generate a non-inverted ultrasonic drive signal $V_{DRIVE}$, for example, as shown in FIG. 12A. The control circuit 1120 may generate an inverted ultrasonic drive signal $V_{DR_INV}$, for example, as shown in FIG. 12B) at the operating frequency for of the oscillator circuit 1130, which may be approximately equal to an ultrasonic transmission frequency $f_{US}$ of the received ultrasonic waves (e.g., as transmitted by the ultrasonic transmitter 1030 shown in FIG. 10). The synchronous rectifier 1166 may receive the non-inverted ultrasonic drive signal $V_{DRIVE}$ and the inverted ultrasonic drive signal $V_{DR_INV}$, and the synchronous rectifier 1166 may use these signals to generate the rectified signal $V_{RECT}$. A filter and amplifier circuit 1168 (e.g., an anti-aliasing filter, such as a bandpass filter) may generate a filtered signal $V_{FILT}$ from the rectified signal $V_{RECT}$ and may have a bandwidth of approximately 50-500 Hz. The filter and amplifier 1168 may be characterized by a gain of approximately 60 dB. The control circuit 1120 may be operable to digitally filter the filtered signal $V_{FILT}$ received from the bandpass filter 1168 to provide additional filtering of the signal.

The control circuit 1120 may receive the filtered signal $V_{FILT}$ from the bandpass filter 1168. The control circuit 1120 may sample the filtered signal using an ADC. The control circuit 1120 may be operable to detect the presence of the occupant in the space by comparing the magnitude of the filtered voltage $V_{FILT}$ to an upper voltage threshold $V_{TH+}$ (e.g., approximately 0.25 volts) and a lower voltage threshold $V_{TH-}$ (as shown in FIGS. 12F and 12G). The synchronous rectifier 1166 may properly rectify the amplified signal $V_{AMP}$, and the filtered voltage $V_{FILT}$ may stay between the upper voltage threshold $V_{TH+}$ and the lower voltage threshold $V_{TH-}$, for example, when the space is vacant. Since the filtered signal $V_{FILT}$ is biased to approximately one-half of the supply voltage $V_{CC1}$ (i.e., approximately 1.5 volts), the filtered signal $V_{FILT}$ may have a DC magnitude equal to approximately 1.5 volts and the filtered signal $V_{FILT}$ may remain between the upper voltage threshold $V_{TH+}$ and the lower voltage threshold $V_{TH-}$, for example, if the space is vacant (as shown in FIG. 12F). If there is an occupant in the space, there may be a Doppler shift in the received ultrasonic waves as compared to the transmitted ultrasonic waves, and the magnitude of the filter voltage $V_{FILT}$ may rise above the upper voltage threshold $V_{TH+}$ and/or fall below the lower voltage threshold $V_{TH-}$ (e.g., as shown in FIG. 12G). The upper voltage threshold $V_{TH+}$ and the lower voltage threshold $V_{TH-}$ may be predetermined fixed values or may be adjustable by the control circuit 1120.

In FIG. 11, the load control device 1100 may include a passive infrared (PIR) sensing circuit 1170, which may, for example, comprise a pyroelectric infrared detector for receiving infrared energy of the occupant through a lens of the load control device (e.g., the lens 1018 of the load control device 1000 shown in FIG. 10). The PIR sensing circuit 1170 may generate a PIR sense signal $V_{PIR}$ representative of the magnitude of the received infrared energy. The control circuit 1120 may be able to analyze both the filtered signal $V_{FILT}$ received from the ultrasonic receiving circuit 1160 and the PIR sense signal $V_{PIR}$ received from the PIR sensing circuit 1170 to determine if an occupancy condition or a vacancy condition is presently occurring in the space.

Figure 13:
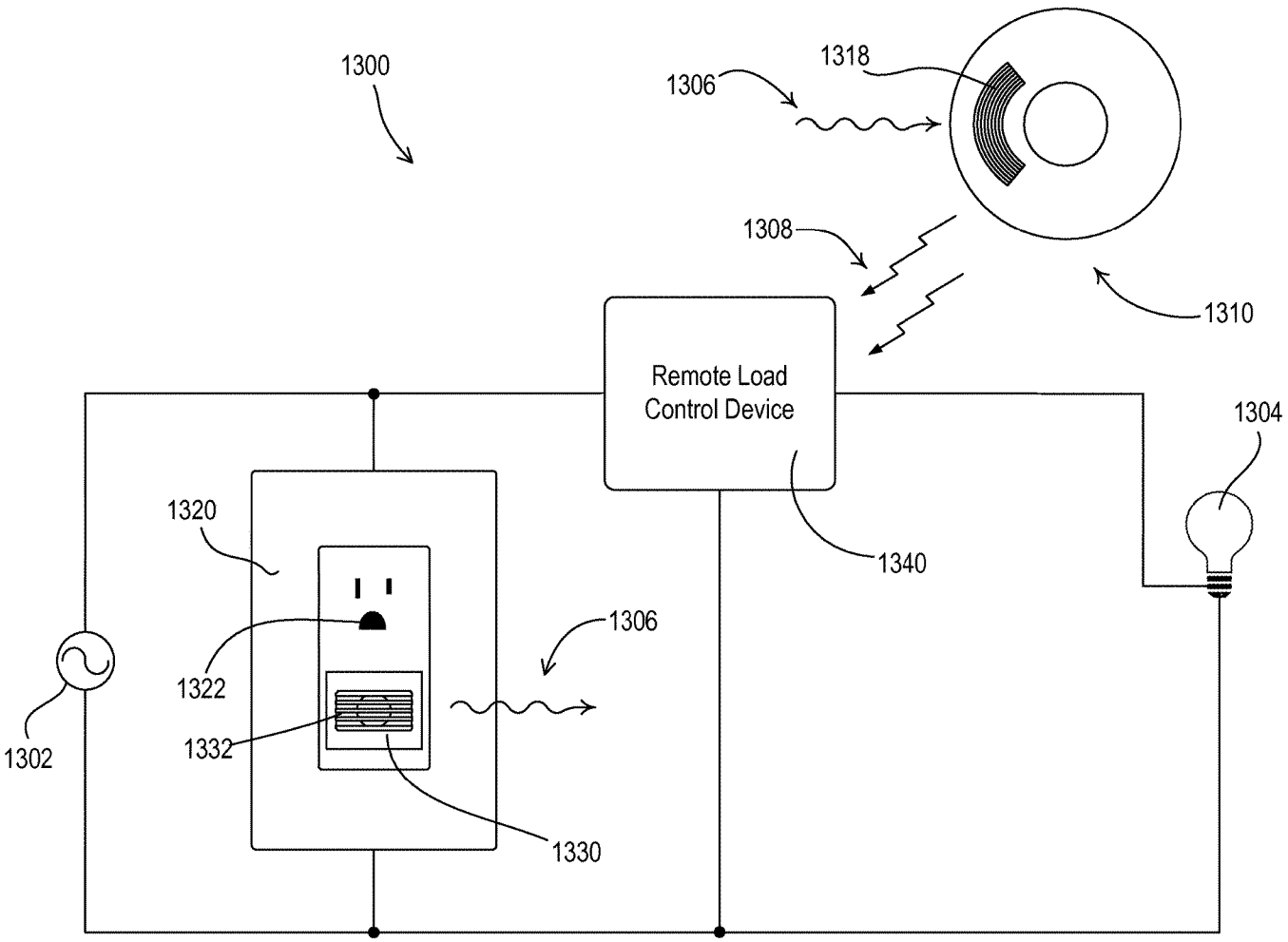
FIG. 13 is a simple diagram of an example load control system (e.g., an ultrasonic sensing system) comprising a wireless ultrasonic sensor (e.g., an ultrasonic receiver) and a remote ultrasonic transmitter.
Figure 14:
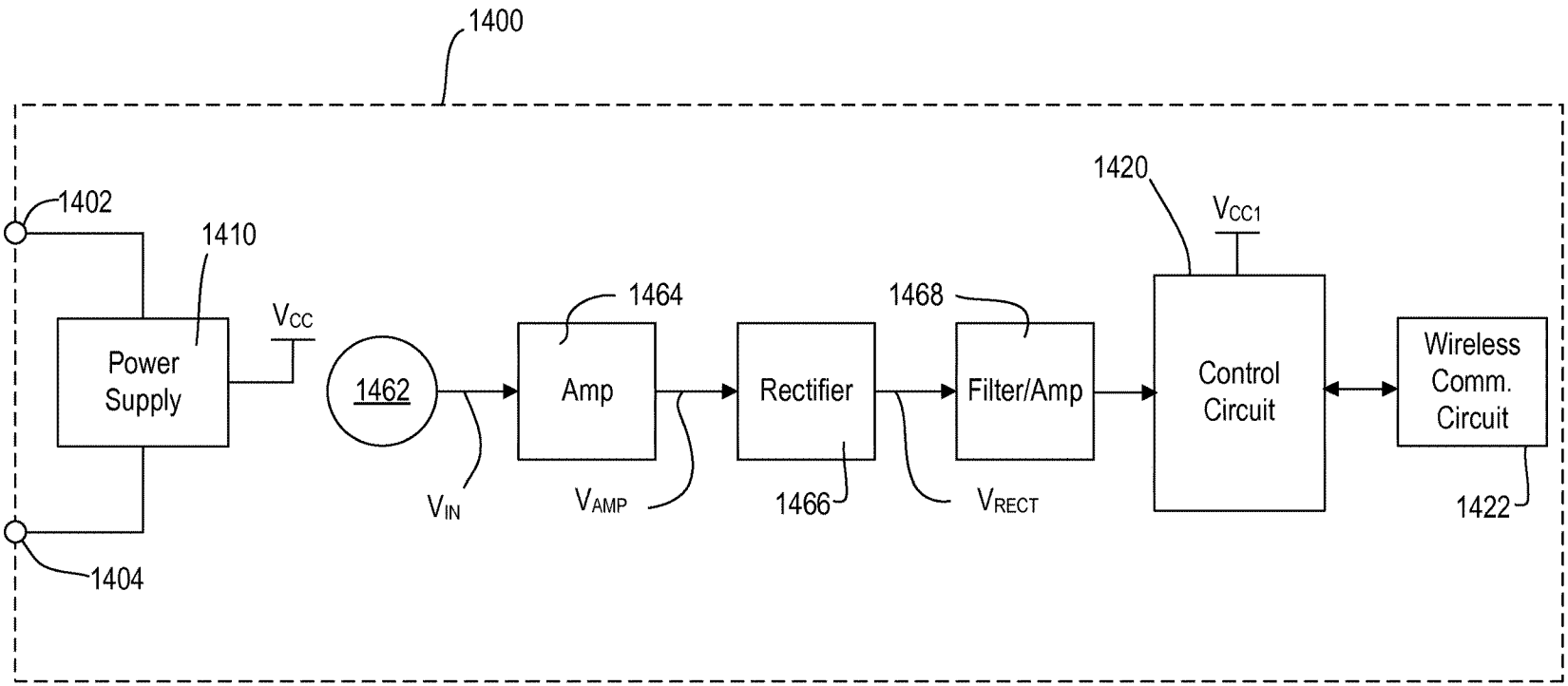
FIG. 14 is a simplified block diagram of an example remote ultrasonic receiver.

FIG. 13 is a simple diagram of an example load control system 1300 (e.g., an ultrasonic sensing system) comprising a wireless ultrasonic sensor 1310 and a remote ultrasonic transmitter 1330 (e.g., the ultrasonic transmitter 900 shown in FIG. 9). The wireless ultrasonic sensor 1310 may be a remote ultrasonic receiver (e.g., the remote ultrasonic receiver 1400 shown in FIG. 14). The remote ultrasonic transmitter 1330 may be operable to be plugged into a receptacle 1322 of an electrical outlet 1320. The remote ultrasonic transmitter 1330 may transmit ultrasonic waves 1306 via an acoustic grill 1332 at an ultrasonic transmission frequency $f_{US}$ (e.g., approximately 40 kHz). The wireless ultrasonic sensor 1310 may be operable to receive the ultrasonic waves 1306 transmitted by the ultrasonic transmitter 1330 via an acoustic grill 1318. For example, the wireless ultrasonic sensor 1310 may have an ultrasonic occupancy detection circuit having an ultrasonic receiving circuit (e.g., only an ultrasonic receiving circuit), such that the remote ultrasonic transmitter 1330 and the wireless ultrasonic sensor 1310 operate as shown in FIGS. 6A and 6B. The wireless ultrasonic sensor 1310 may include an ultrasonic receiving circuit and an ultrasonic transmitting circuit. The ultrasonic receiving circuit of the wireless ultrasonic sensor 1310 may include a synchronous rectifier (e.g., similar to the synchronous rectifier of the load control device 1100 shown in FIG. 11). The wireless ultrasonic sensor 1310 (e.g., the ultrasonic receiver 1400 as shown in FIG. 14) may be configured to transmit wireless signals, e.g., radio-frequency (RF) signals 1308 in response to the received ultrasonic waves 1306. For example, the wireless ultrasonic sensor 1310 may be battery-powered. An example of a battery-powered wireless ultrasonic sensor is described in greater detail in previously-referenced U.S. Pat. No. 8,514,075.

The load control system 1300 may include a remote load control device 1340. The remote load control device 1340 may be coupled in series electrical connection between an AC power source 1302 and an electrical load (e.g., a lighting load 1304), such as for controlling the intensity of the lighting load. The remote load control device 1340 may be electrically coupled to the neutral side of the AC power source 1302 or to an earth ground connection. The remote load control device 1340 may be adapted to be remotely mounted, for example, to a junction box above a ceiling or in an electrical closet, such that the remote load control device is not easily accessible by a user. The remote load control device 1340 may be configured to control the lighting load 1304 in response to digital messages transmitted by the wireless ultrasonic sensor 1310 via the RF signals 1308 (e.g., in a similar manner as the load control device 1100 of FIG. 11). The load control system 1300 may include a wall-mounted load control device responsive to the RF signals 1308 transmitted by the wireless ultrasonic sensor 1310 (e.g., a wireless dimmer switch). The load control device 1340 and remote ultrasonic sensor 1310 may be located, for example, on a tabletop, a chair, or in a wallbox where a switch for an LED bulb is located.

FIG. 14 is a simplified block diagram of an example remote ultrasonic receiver 1400 (e.g., the remote ultrasonic sensor 1310 of the load control system 1300 of FIG. 13). The ultrasonic receiver 1400 may include a power supply 1410 operable to receive power via electrical connections 1402, 1404. The ultrasonic receiver 1400 may include a power supply 1410 to generate a DC supply voltage $V_{CC}$ (e.g., approximately 12 volts). For example, the electrical connections 1402, 1404 may have prongs (e.g., the prongs 434 shown in FIG. 4) adapted to be plugged into a receptacle of an electrical outlet for powering the ultrasonic receiver 1400 from an AC power source. The power supply 1410 may be operable to convert the AC source voltage of the AC power source to the DC supply voltage $V_{CC}$. The electrical connections 1402, 1404 may be adapted to be coupled to an external DC power supply for receiving a DC source voltage. The power supply 1410 may be a DC-to-DC converter for converting the DC source voltage to the DC supply voltage $V_{CC}$. The power supply 1410 may be replaced by one or more batteries.

The ultrasonic receiving circuit 1460 may include a piezoelectric element 1462. The piezoelectric element 1462 may generate a received ultrasonic input signal $V_{IN}$ in response to the received ultrasonic waves (e.g., the received ultrasonic waves shown in FIGS. 5B and 6B). The input signal $V_{IN}$ may be received by an amplifier 1464 (e.g., a non-linear amplifier). The amplifier 1464 may generate an amplified signal $V_{AMP}$ and may be characterized by a gain of approximately 20 dB. The ultrasonic receiving circuit 1460 may include a rectifier circuit 1466 (e.g., an asynchronous rectifier). The rectifier circuit 1466 may receive the amplified signal $V_{AMP}$ from the amplifier circuit 1464 and generate a rectified signal $V_{RECT}$. For example, the rectifier circuit 1466 may include a diode feeding the parallel combination of a resistor and a capacitor. Since the ultrasonic receiving circuit 1460 may receive some of the unreflected ultrasonic waves transmitted by an ultrasonic transmitter (e.g., the remote ultrasonic transmitter 230 of FIG. 2, the ultrasonic transmitters 712 of FIG. 7, and/or the ultrasonic transmitted 900 of FIG. 9), the magnitude of the amplified signal $V_{AMP}$ received by the rectifier circuit 1466 may be greater than the forward drop of the diode of the rectifier circuit, such that the rectifier circuit may properly generate the rectified signal $V_{RECT}$. The rectifier circuit 1466 may include a synchronous rectifier as described in previously-referenced U.S. Pat. No. 8,514,075.

The remote ultrasonic receiver 1400 may include a control circuit 1420. The control circuit 1420 may include a microcontroller, a programmable logic device (PLD), a microprocessor, an application specific integrated circuit (ASIC), a field-programmable gate array (FPGA), or any suitable processing device, controller, or control circuit. The remote ultrasonic receiver 1400 may include a wireless communication circuit 1422, for example, including a radio-frequency (RF) transceiver coupled to an antenna for transmitting and/or receiving wireless signals (e.g., RF signals). The communication circuit 1422 may comprise an RF transmitter for transmitting RF signals, an RF receiver for receiving RF signals, or an infrared (IR) transmitter and/or receiver for transmitting and/or receiving IR signals. The wireless communication circuit 1422 may be in electrical communication with the control circuit 1420, such that one or more wireless signals received from the ultrasonic transmitter may cause the ultrasonic receiver 1400 to transmit signals to a load control device (e.g., such as the remote load control device 1340 of FIG. 13). The antenna of the wireless communication circuit 1422 may be enclosed in the housing of remote ultrasonic receiver 1400 or coupled to the exterior portion of the housing.

Figure 15:
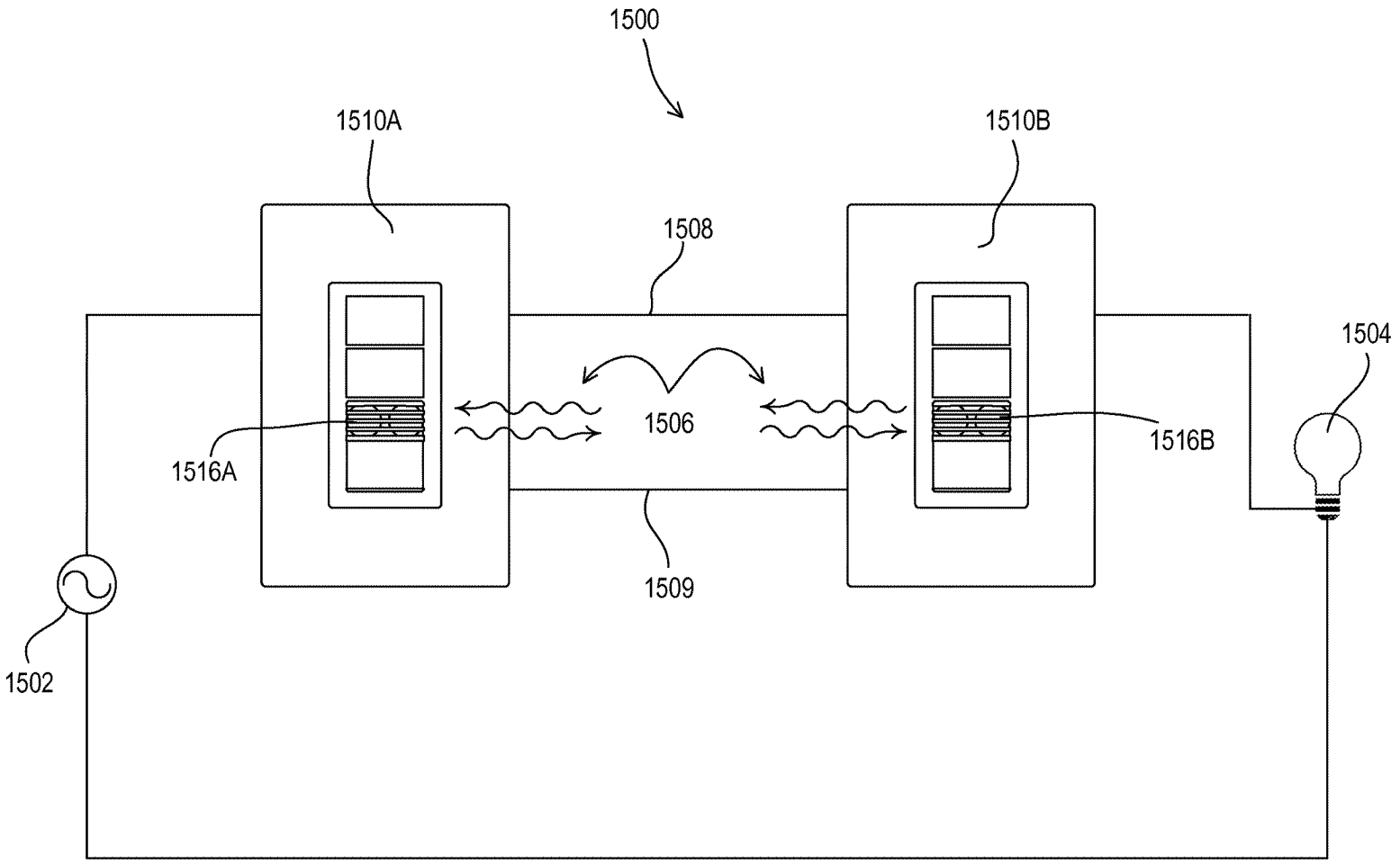
FIG. 15 is a simple diagram of an example three-way load control system (e.g., an ultrasonic sensing system) comprising first and second load control devices (e.g., ultrasonic sensors).

FIG. 15 is a simple diagram of an example three-way load control system 1500 (e.g., an ultrasonic sensing system) comprising first and second load control devices 1510A, 1510B (e.g., ultrasonic sensors). The first and second load control devices 1510A, 1510B may be coupled together in series electrical connection between an alternating-current (AC) power source 1502 and an electrical load (e.g., a lighting load 1504). The first and second load control devices 1510A, 1510B may be installed to replace two single-pole double-throw (SPDT) switches (e.g., three-way switches) of a three-way switching system. As shown in FIG. 15, the first and second load control devices 1510A, 1510B may not be coupled to the neutral side of the AC power source 1502. Examples of load control devices for three-way load control systems are described in greater detail in commonly-assigned U.S. Pat. No. 7,847,440, issued Dec. 7, 2010, entitled LOAD CONTROL DEVICE FOR USE WITH LIGHTING CIRCUITS HAVING THREE-WAY SWITCHES, the entire disclosure of which is hereby incorporated by reference. The load control devices 1510A, 1510B may be coupled to the neutral side of the AC power source 1502 and/or an earth ground connection.

The load control devices 1510A, 1510B may be similar to the load control devices 210, 1010 shown in FIGS. 2 and 10, respectively. The load control device 1510A, 1510B may operate together to control the power delivered to the lighting load 1504. The load control devices 1510A, 1510B may be coupled together via a first electrical wire 1508 and a second electrical wire 1509. The first electrical wire 1508 may conduct a load current from the AC power source 1502 to the lighting load 1504. The second electrical wire 1509 may allow for communication between the load control devices. The first and second load control devices 1510A, 1510B may be identical devices (e.g., may have the same electrical circuitry). For example, the first and second load control devices 1510A, 1510B may have a controllable conductive device coupled in series with the first electrical wire 1508 for conducting the load current between the AC power source 1502 and the lighting load 1504. The load control devices 1510A, 1510B may include internal ultrasonic occupancy detection circuits having ultrasonic transmitters and receivers. The load control devices 1510A, 1510B may transmit and receive ultrasonic waves 1506 via respective acoustic grills 1516A, 1516B. The load control devices 1510A, 1510B may be operable to detect the presence or absence of an occupant in the space surrounding the two load control devices in response to reflected and/or attenuated ultrasonic waves as shown in FIGS. 5A-6B.

The load control devices 1510A, 1510B may be operable to communicate with each other via the second electrical wire 1509, for example, to determine how to control the lighting load 1504 in response to detecting the presence or absence of an occupant. For example, the second load control device 1510B may establish itself as a master device in the load control system 1500. The first load control device 1510A may render its controllably conductive device conductive substantially fully conductive. The first load control device 1510A may transmit digital messages to the second load control device 1510B via the second electrical wire 1509 in response to detecting the presence or absence of an occupant. The second load control device 1510B may control its controllably conductive device to control the power delivered to the lighting load 1504 in response to its internal ultrasonic occupancy detection circuit and/or the digital messages received from the first load control device 1510A.

The load control system 1500 may include one or more ultrasonic transmitters (e.g., the ultrasonic transmitter 230 shown in FIG. 2 or the ultrasonic transmitter 900 shown in FIG. 9). The first load control device 1510A may include only an ultrasonic transmitter and/or the second load control device 1510B may include only an ultrasonic receiver, such that the load control system 1500 may operate, for example, as shown in FIGS. 6A and 6B. In addition, the first load control device 1510A may operate as the master device of the load control system 1500.

What is claimed is:

1. A load control system for controlling power delivered from a power source to an electrical load, the system comprising:

a load control device configured to be coupled in series between the power source and the electrical load for controlling the power to the electrical load *via a switching circuit*, the load control device comprising a *load control device* communication circuit;

a remote ultrasonic transmitter configured to transmit ultrasonic waves characterized by an ultrasonic frequency and an amplitude, wherein the remote ultrasonic transmitter does not include a receiver for receiving ultrasonic waves transmitted by the remote ultrasonic transmitter; and a sensor comprising:

a *sensor* communication circuit;

a local ultrasonic transmitter configured to transmit ultrasonic waves at the ultrasonic frequency;

an ultrasonic receiver configured to receive attenuated ultrasonic waves from the remote ultrasonic transmitter and configured to*:* receive reflections of the ultrasonic waves transmitted by the local ultrasonic transmitter;

*convert a change in amplitude of the attenuated ultrasonic waves received from the remote ultrasonic transmitter and the change in frequency of the received reflected ultrasonic waves from the local transmitter to a voltage signal; and* a control circuit coupled to the *sensor* communication circuit and to the ultrasonic receiver, the control circuit configured to:

[receive, via the ultrasonic receiver, signals representing the attenuated ultrasonic waves and the reflected ultrasonic waves;

determine occupancy from the received signals based on at least one of (i) a change in amplitude between the attenuated ultrasonic waves and the characterized amplitude and (ii) a change in frequency between the reflected ultrasonic waves and the characterized ultrasonic frequency]

*determine whether the voltage signal is at least one of: greater than upper voltage threshold value or less than a lower voltage threshold value;*

*determine an occupancy condition exists responsive to at least one of: the voltage signal being greater than the upper voltage threshold value or the voltage signal being less than a lower voltage threshold value*; and transmit a command via the *sensor* communication circuit to the load control device based on the determination of occupancy;

wherein the load control device, the remote ultrasonic transmitter [device], and the sensor are each separate devices; and further wherein the load control device is configured to receive the command via the communication circuit of the load control device and to control the power delivered *via the switching circuit* to the electrical load in response to the command.

2. The system of claim 1, wherein the remote ultrasonic transmitter comprises an ultrasonic transmitting element, a drive circuit for energizing the ultrasonic transmitting element, and a low phase-noise oscillator circuit directly driving the drive circuit to cause the ultrasonic transmitting element to transmit ultrasonic waves at the ultrasonic frequency.

3. The system of claim 2, wherein the remote ultrasonic transmitter further comprises an internal power supply generating a supply voltage for powering the oscillator circuit and the drive circuit.

4. The system of claim 3, wherein the power supply of the remote ultrasonic transmitter is configured to generate the supply voltage from an AC line voltage of an AC power source.

5. The system of claim 4, wherein the remote ultrasonic transmitter is configured to be plugged into an electrical outlet.

6. The system of claim 3, further comprising:

an external power supply configured to generate a DC voltage from an AC line voltage of an AC power source;

wherein the power supply of the remote ultrasonic transmitter is configured to generate the supply voltage from the DC voltage of the external power supply.

7. The system of claim 2, wherein the remote ultrasonic transmitter further comprises a battery configured to produce a battery voltage for powering the oscillator circuit and the drive circuit.

8. The system of claim 2, wherein the low phase-noise oscillator circuit comprises a Pierce oscillator circuit having a crystal.

9. The system of claim 1, wherein the load control device comprises a ceiling mounted load control device.

10. The system of claim 1, wherein the load control device is configured to turn the electrical load on and off in response to the ultrasonic waves received by the ultrasonic receiver.

11. The system of claim 1, wherein the ultrasonic frequency is 40 kHz±2 Hz.

12. The system of claim 1, wherein the electrical load comprises a lighting load.

13. The system of claim 1, wherein the remote ultrasonic transmitter and the local ultrasonic transmitter each continuously transmit the respective ultrasonic waves.

14. The system of claim 1, wherein the sensor is configured to be mounted to a ceiling.

15. The system of claim 14, wherein the sensor is a powered by a battery.

16. The system of claim 1, wherein the *sensor* communication circuit is a wireless communication circuit.

17. The system of claim 1, further comprising at least two remote ultrasonic transmitters.

18. The system of claim 17, wherein the at least two remote ultrasonic transmitters and the sensor each comprises an ultrasonic coverage pattern based on the transmission of the respective ultrasonic waves from the respective ultrasonic transmitter, and wherein the at least two remote ultrasonic transmitters and the sensor are placed in a room such that the respective ultrasonic coverage patterns of each of the at least two remote ultrasonic transmitters and the sensor overlap to substantially fill the room with ultrasonic waves.

19. The system of claim 18, wherein the at least two remote ultrasonic transmitters are configured to increase a range of occupancy detection within the room.

20. The system of claim 19, wherein the room comprises [at least]*:* a first[.] *wall including the sensor;* a second *wall including at least one remote transmitter;* and a third wall[, wherein each wall has at least one of: the at least two] *including at least one* remote ultrasonic [transmitters and the sensor] *transmitter*.

21. The system of claim 1, wherein the remote ultrasonic transmitter is configured to be located on a first wall, and the sensor is configured to be located on a second wall, the first wall being different from the second wall.

22. A load control system for controlling [the] power delivered from a power source to an electrical load, the system comprising:

a remote ultrasonic transmitter configured to transmit ultrasonic waves characterized by an ultrasonic frequency, wherein the remote ultrasonic transmitter does not include a receiver for receiving ultrasonic waves transmitted by the remote ultrasonic transmitter, and wherein the remote ultrasonic transmitter is configured to be plugged into an electrical outlet; [and]

a load control device that is a separate device from the remote ultrasonic transmitter and that is adapted to be coupled in series electrical connection between the power source and the electrical load for controlling the power delivered to the electrical load *via a switching circuit*, the load control device comprising a *load control device* communication circuit; *and* a sensor comprising:

a *sensor* communication circuit;

a local ultrasonic transmitter configured to transmit ultrasonic waves at the ultrasonic frequency;

an ultrasonic receiver configured to*:* receive ultrasonic waves from the remote ultrasonic transmitter [and to]*:* receive ultrasonic waves from the local ultrasonic transmitter;

*convert a change in amplitude of the attenuated ultrasonic waves received from the remote ultrasonic transmitter and the change in frequency of the received reflected ultrasonic waves from the local transmitter to a voltage signal; and* a control circuit operatively coupled to the ultrasonic receiver, the control circuit configured to:

[(i) detect occupancy based on the received ultrasonic waves by at least one of:

(a) detecting a period of amplitude modulation from the ultrasonic waves received from the remote ultrasonic transmitter, and (b) detecting a Doppler shift of the ultrasonic frequency from the ultrasonic waves received from the local ultrasonic transmitter;]

*determine whether the voltage signal is at least one of: greater than upper voltage threshold value or less than a lower voltage threshold value;*

*determine an occupancy condition exists responsive to at least one of: the voltage signal being greater than the upper voltage threshold value or the voltage signal being less than a lower voltage threshold value;* and

[(ii)] transmit a command via the *sensor* communication circuit to the load control device based on the determination of occupancy;

wherein the sensor is separate from the load control device and the remote ultrasonic transmitter [device];

further wherein the load control device is configured to receive the command via the communication circuit of the load control device and to control the power delivered *via the switching circuit* to the electrical load in response to the command.

23. The system of claim 22, wherein the load control device further comprises a controllably conductive device comprising a relay.

24. The system of claim 22, wherein the remote ultrasonic transmitter is configured to be located on a first wall, and the load control device is configured to be located on a second wall, the first wall being different from the second wall.

*25. A system comprising:*

*a remote ultrasonic transmitter configured to transmit ultrasonic waves characterized by an ultrasonic frequency, wherein the remote ultrasonic transmitter does not include a receiver for receiving ultrasonic waves transmitted by the remote ultrasonic transmitter; and*

*a sensor comprising:*

*a sensor communication circuit;*

*a local ultrasonic transmitter configured to transmit ultrasonic waves at the ultrasonic frequency;*

*an ultrasonic receiver configured to:*

*receive ultrasonic waves, wherein the received ultrasonic waves comprise attenuated ultrasonic waves transmitted by the remote ultrasonic transmitter and reflected ultrasonic waves transmitted by the local ultrasonic transmitter;*

*convert a change in amplitude of the attenuated ultrasonic waves received from the remote ultrasonic transmitter and the change in frequency of the received reflected ultrasonic waves from the local transmitter to a voltage signal;*

*generate one or more ultrasonic sense signals in response to determining whether there are periods of frequency modulation in the received ultrasonic waves; and*

*a control circuit operatively coupled to the sensor communication circuit and the ultrasonic receiver, the control circuit configured to:*

*receive the voltage signal generated by the ultrasonic receiver;*

*determine whether the voltage signal is at least one of: greater than upper voltage threshold value or less than a lower voltage threshold value;*

*determine an occupancy condition exists responsive to at least one of: the voltage signal being greater than the upper voltage threshold value or the voltage signal being less than a lower voltage threshold value;*

*transmit a command via the sensor communication circuit that indicates the space is occupied in response to the determination that an occupany condition exists within the space;*

*wherein the remote ultrasonic transmitter and the sensor are separate devices.*

*26. The system of claim 25, further comprising:*

*wherein the remote ultrasonic transmitter comprises a first remote ultrasonic transmitter, the system further comprising a second remote ultrasonic transmitter configured to transmit ultrasonic waves characterized by the ultrasonic frequency; and*

*wherein the ultrasonic receiver is further configured to:*

*receive ultrasonic waves transmitted by the local ultrasonic transmitter; and*

*determine whether there are periods of frequency modulation in the received ultrasonic waves transmitted by the local ultrasonic transmitter.*

*27. The system of claim 25,*

*wherein each of the plurality of remote ultrasonic transmitters further comprises an ultrasonic transmitting element, a drive circuit configured to energize the*

*ultrasonic transmitting element, and a low phase-noise oscillator circuit configured to directly drive the drive circuit to cause the ultrasonic transmitting element to transmit the ultrasonic waves at the ultrasonic frequency.*

*28. The system of claim 27,*

*wherein each of the plurality of remote ultrasonic transmitters further comprises a power supply configured to generate a supply voltage for powering the low phase-noise oscillator circuit and the drive circuit.*

*29. The system of claim 28, wherein the power supply of each of the plurality of remote ultrasonic transmitters is further configured to generate the supply voltage from an AC line voltage of an AC power source.*

*30. The system of claim 27,*

*wherein each of the plurality of remote ultrasonic transmitters is further configured to power the low phase-noise oscillator circuit and the drive circuit from a battery.*

*31. The system of claim 25, wherein the sensor is configured to be mounted to a ceiling.*

*32. A system comprising:*

*a plurality of remote ultrasonic transmitters, each configured to transmit ultrasonic waves characterized by an ultrasonic frequency, wherein each of the plurality of remote ultrasonic transmitters does not include a receiver for receiving ultrasonic waves; and*

*a sensor comprising:*

*a sensor communication circuit;*

*a local ultrasonic transmitter disposed proximate the ultrasonic receiver;*

*an ultrasonic receiver configured to:*

*receive ultrasonic waves, wherein the received ultrasonic waves comprise attenuated ultrasonic waves transmitted by the plurality of remote ultrasonic transmitters and reflected ultrasonic waves from the local ultrasonic transmitter; and*

*convert at least one of: a change in amplitude of the attenuated ultrasonic waves received from the remote ultrasonic transmitter or the change in frequency of the received reflected ultrasonic waves from the local transmitter to a voltage signal; and*

*a control circuit operatively coupled to the sensor communication circuit and the ultrasonic receiver, the control circuit configured to:*

*receive the voltage signal generated by the ultrasonic receiver;*

*determine whether the voltage signal is at least one of: greater than upper voltage threshold value or less than a lower voltage threshold value;*

*determine an occupancy condition exists responsive to at least one of: the voltage signal being greater than the upper voltage threshold value or the voltage signal being less than a lower voltage threshold value;*

*transmit a command via the sensor communication circuit that indicates the space is occupied in response to the determination that an occupancy condition exists within the space;*

*wherein each of the plurality of remote ultrasonic transmitters and the sensor are separate devices.*

*33. The system of claim 32,*

*wherein each of the plurality of remote ultrasonic transmitters further comprises an ultrasonic transmitting element, a drive circuit configured to energize the ultrasonic transmitting element, and a low phase-noise oscillator circuit configured to directly drive the drive circuit to cause the ultrasonic transmitting element to transmit the ultrasonic waves at the ultrasonic frequency.*

*34. The system of claim 33,*

*wherein each of the plurality of remote ultrasonic transmitters further comprises a power supply configured to generate a supply voltage for powering the low phase-noise oscillator circuit and the drive circuit.*

*35. The system of claim 34, wherein the power supply of each of the plurality of remote ultrasonic transmitters is further configured to generate the supply voltage from an AC line voltage of an AC power source.*

*36. The system of claim 33, wherein each of the plurality of remote ultrasonic transmitters is further configured to power the low phase-noise oscillator circuit and the drive circuit from a battery.*

*37. The system of claim 32, wherein the sensor is configured to be mounted to a ceiling.*

* * * * *